United States Patent
Nakashima

(10) Patent No.: US 9,487,180 B2
(45) Date of Patent: Nov. 8, 2016

(54) VEHICULAR CURTAIN AIR-BAG DEVICE, AND MOUNTING STRUCTURE FOR SAME

(71) Applicant: Autoliv Development AB, Vårgårda (SE)

(72) Inventor: Atsushi Nakashima, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/891,430

(22) PCT Filed: May 14, 2014

(86) PCT No.: PCT/JP2014/062803
§ 371 (c)(1),
(2) Date: Nov. 16, 2015

(87) PCT Pub. No.: WO2014/188922
PCT Pub. Date: Nov. 27, 2014

(65) Prior Publication Data
US 2016/0107602 A1    Apr. 21, 2016

(30) Foreign Application Priority Data

May 23, 2013  (JP) ................................ 2013-109307
Jun. 4, 2013   (JP) ................................ 2013-118295

(51) Int. Cl.
*B60R 21/232*   (2011.01)
*B60R 21/213*   (2011.01)
(Continued)

(52) U.S. Cl.
CPC .......... *B60R 21/232* (2013.01); *B60R 21/213* (2013.01); *B60R 21/233* (2013.01);
(Continued)

(58) Field of Classification Search
CPC .......... B60R 21/232; B60R 21/23138; B60R 21/233; B60R 21/213; B60R 21/2338; B60R 2021/23324; B60R 2021/23161; B60R 2021/23386
See application file for complete search history.

(56) References Cited

U.S. PATENT DOCUMENTS 7,784,823 B2 *  8/2010  Heigl .................... B60R 21/213
                                                    280/730.2
8,573,637 B2 * 11/2013  Fink ..................... B60R 21/232
                                                    280/730.2
(Continued)

FOREIGN PATENT DOCUMENTS

DE   10 2006 056 603 A1    6/2008
JP       2004-256000 A     9/2004
(Continued)

OTHER PUBLICATIONS

PCT International Search Report Aug. 5, 2014.

*Primary Examiner* — Drew Brown
(74) *Attorney, Agent, or Firm* — Brinks Gilson & Lione

(57) ABSTRACT

A vehicular curtain airbag apparatus and an attachment structure configured not to interfere with a driver seat airbag and being able to appropriately provide occupant protection performance either in normal and small overlap collision modes, and the curtain airbag having a simple configuration. The apparatus includes a main chamber having a front end to be deployed and inflated at a position near a front pillar, and an additional chamber further toward a vehicle front side and to be deployed and inflated, and separated from the main chamber by a partition portion between the front pillar and an inflation area of a driver seat airbag. The additional chamber is folded back near the partition portion toward the vehicle interior and a rear of the vehicle to overlap the main chamber, and parts of a resultant overlapping portion corresponding to upper portions of the main and additional chambers or vicinities of the parts are coupled together to form a chamber coupling portion.

35 Claims, 15 Drawing Sheets

(51) Int. Cl.
  *B60R 21/233* (2006.01)
  *B60R 21/2338* (2011.01)
  *B60R 21/231* (2011.01)
(52) U.S. Cl.
  CPC ..... *B60R21/2338* (2013.01); *B60R 21/23138* (2013.01); *B60R 2021/23161* (2013.01); *B60R 2021/23324* (2013.01); *B60R 2021/23386* (2013.01)

(56) References Cited

U.S. PATENT DOCUMENTS

| | | | | |
|---|---|---|---|---|
| 8,998,250 | B2* | 4/2015 | Kruse | B60R 21/232 |
| | | | | 280/729 |
| 2008/0129023 | A1 | 6/2008 | Heigl et al. | |
| 2010/0032930 | A1* | 2/2010 | Yamamura | B60R 21/232 |
| | | | | 280/730.2 |
| 2011/0079990 | A1* | 4/2011 | Cheal | B60R 21/213 |
| | | | | 280/730.2 |
| 2012/0256401 | A1* | 10/2012 | Kato | B60R 21/213 |
| | | | | 280/730.2 |
| 2013/0134694 | A1* | 5/2013 | Matsushita | B60R 21/213 |
| | | | | 280/729 |
| 2013/0341894 | A1* | 12/2013 | Nakashima | B60R 21/233 |
| | | | | 280/730.2 |
| 2014/0042732 | A1* | 2/2014 | Taguchi | B60R 21/233 |
| | | | | 280/729 |
| 2016/0001732 | A1* | 1/2016 | Asada | B60R 21/232 |
| | | | | 280/729 |
| 2016/0114754 | A1* | 4/2016 | Kawamura | B60R 21/2334 |
| | | | | 280/728.2 |

FOREIGN PATENT DOCUMENTS

| | | |
|---|---|---|
| JP | 2008-001197 A | 1/2008 |
| JP | 2012-096780 A | 5/2012 |
| JP | 2012-218619 A | 11/2012 |
| JP | 2013-091440 A | 5/2013 |
| JP | 2004-090662 A | 3/2014 |
| WO | WO 2012/091656 A1 | 7/2012 |
| WO | WO 2012/111073 A1 | 8/2012 |

* cited by examiner

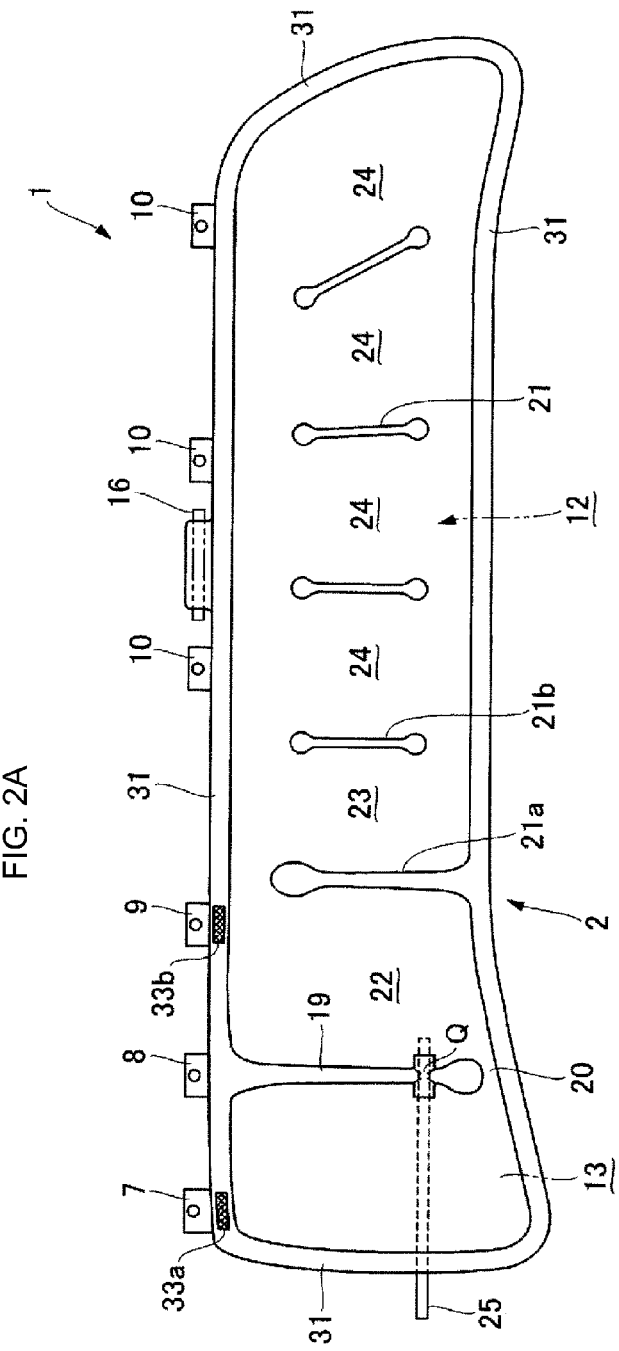
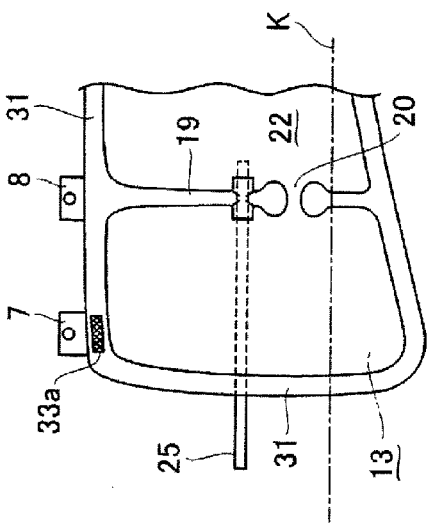
FIG. 2A
FIG. 2B

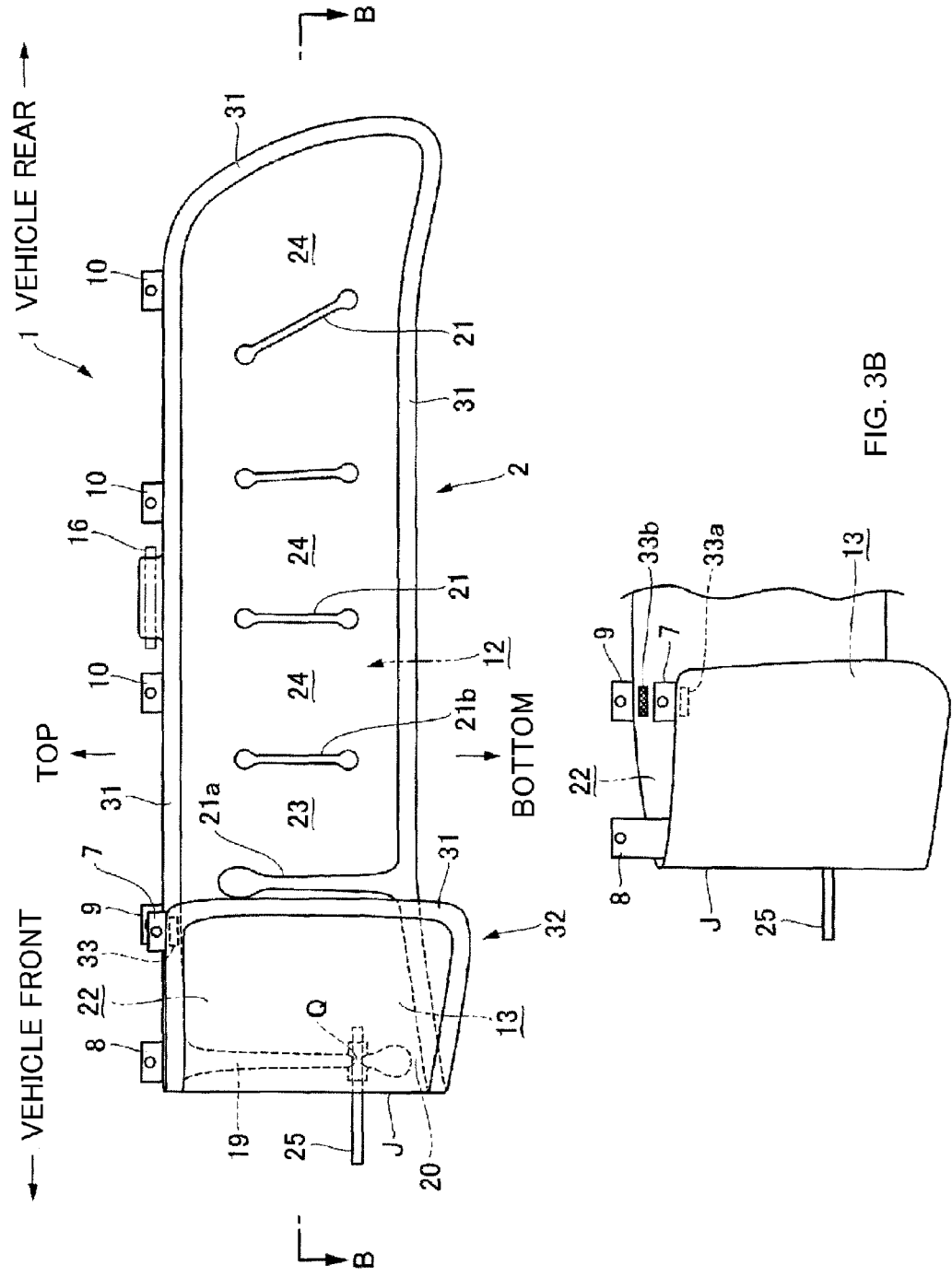

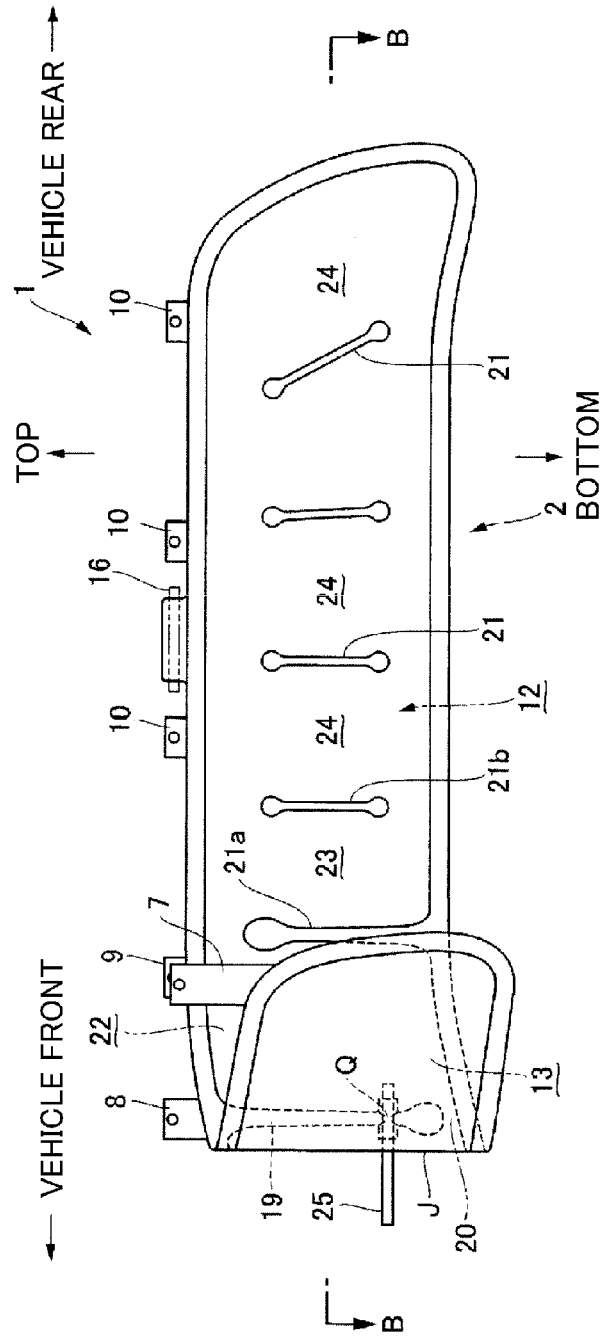

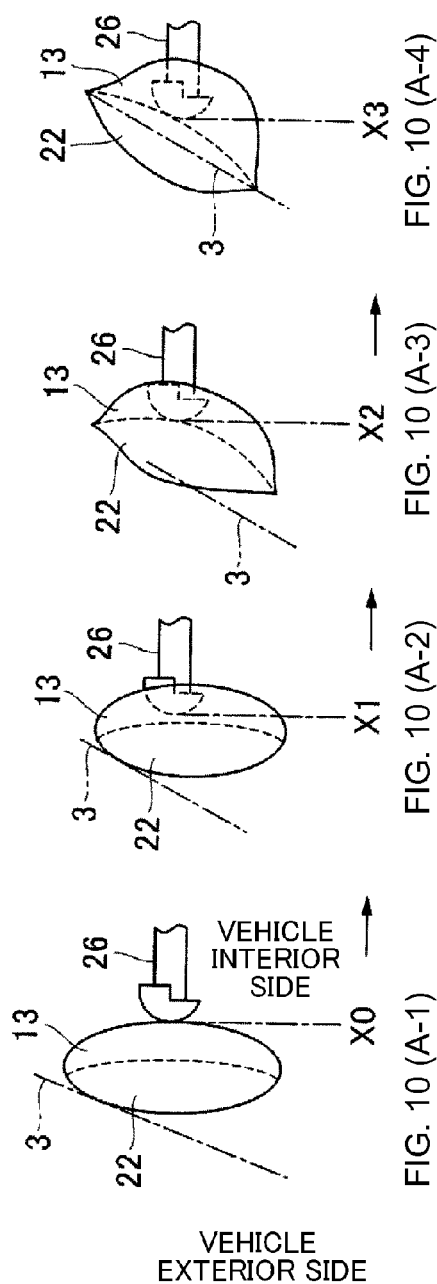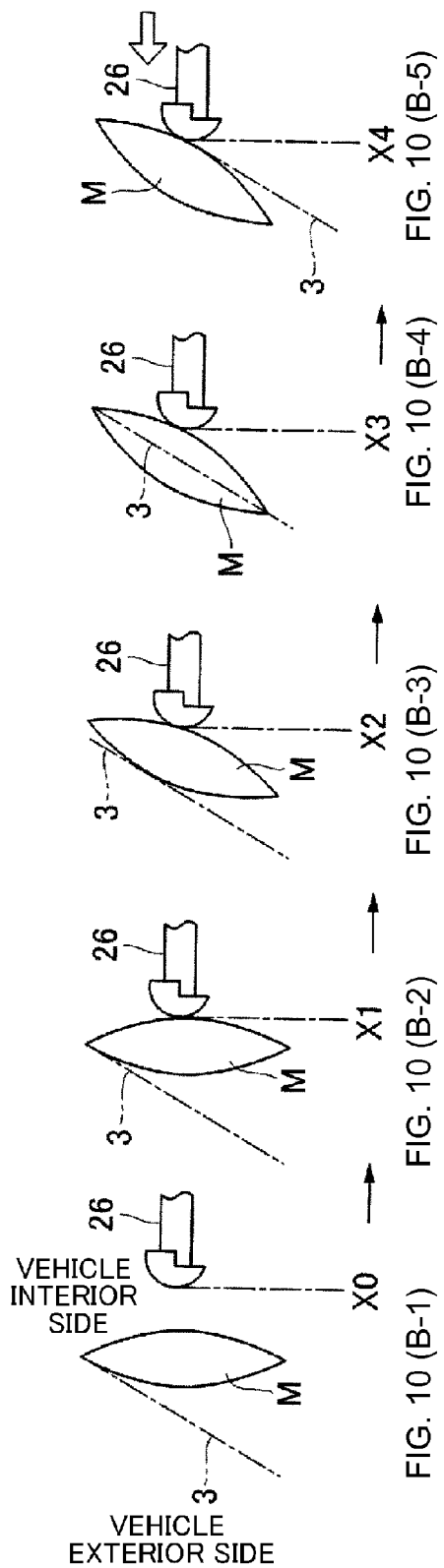

| No. | DISTANCE h(mm) | EVALUATION OF EXTERIOR EJECTION PREVENTION PERFORMANCE |
|---|---|---|
| GROUP 1 | 0~10 | × |
| GROUP 2 | 10~20 | △ |
| GROUP 3 | 20~30 | ○ |
| GROUP 4 | 30~40 | ◎ |
| GROUP 5 | 40~50 | ◎ |
| GROUP 6 | 50~60 | ○ |
| GROUP 7 | 60~70 | △ |
| GROUP 8 | 70~80 | × |

FIG. 13A

| DISTANCE h(mm) | DISTANCE OF PROTRUSION (mm) |
|---|---|
| 0 | 83 |
| 5 | 81 |
| 10 | 80 |
| 15 | 79 |
| 20 | 78 |
| 25 | 77 |
| 30 | 76 |
| 35 | 75 |
| 40 | 74 |
| 45 | 75 |
| 50 | 76 |
| 55 | 77 |
| 60 | 78 |
| 65 | 79 |
| 70 | 80 |
| 75 | 83 |
| 80 | 85 |

VEHICULAR CURTAIN AIR-BAG DEVICE, AND MOUNTING STRUCTURE FOR SAME

CROSS REFERENCE TO RELATED APPLICATIONS

This application claims priority to Japanese Patent Application Nos. 2013-109307, filed May 23, 2013, 2013-118295, filed Jun. 4, 2013 and PCT/JP2014/062803, filed on May 14, 2014.

FIELD OF THE INVENTION

The present invention relates to a vehicular curtain airbag apparatus that does not interfere with a driver seat airbag or a passenger seat airbag and that can appropriately provide occupant protection performance either in a normal collision mode, in which the driver and passenger seat airbags and a curtain airbag function, or in a small-overlap mode, with the curtain airbag being configured to have a simple airbag configuration and a simple structure for attachment to the vehicle. The present invention also relates to an attachment structure for the vehicular curtain airbag apparatus.

DESCRIPTION OF THE RELATED ART

Forms of vehicular collisions include a small overlap mode, and effort has been made to improve occupant protection performance for the mode. The small overlap mode refers to an offset head-on collision mode in which a colliding object overlaps only a part of a vehicle extending from an end of the vehicle in a width direction to a point of the vehicle corresponding to 25% of the vehicle width. In this collision mode, a rotational moment is applied to the vehicle, and in the vehicle, an occupant obliquely rushes to an area between a windshield and side window glass.

WO 2012/111073A1, WO 2012-091656A1, and US Patent Application Publication No. 2008/0129023A1 disclose curtain airbags developed to allow appropriate protection of the occupant rushing toward a front pillar between the windshield and the side window glass.

An "occupant protecting apparatus" in WO 2012/111073A1 includes a curtain shield airbag main body suspended from the front pillar and a roof panel and in which a first chamber, a second chamber, and a third chamber are formed; the first chamber and the second chamber are deployed in a space between the driver's head and both a side window and a center pillar, and the third chamber is deployed in a space between the driver's head and all of the side window, the front pillar, and an instrument panel. At the time of a micro-lap collision, the deployed third chamber is subjected to a reaction force from the instrumental panel to receive the driver's head moving toward the front pillar.

A "curtain airbag for a vehicle" in WO 2012-091656A1 includes a main chamber configured to be inflated at a position where the main chamber is attached to the vehicle, to cover an interior structure of the vehicle, and an additional chamber mounted in front of the main chamber in a vehicle traveling direction and deployed toward the interior of the vehicle when the curtain airbag is inflated.

A "vehicle occupant restraint system" in US Patent Application Publication No. 2008/0129023A1 has a side gas bag folded and arranged along a roof frame of the vehicle and configured such that, when the side gas bag is inflated, a front inflation portion at a front end of the bag protrudes further toward the interior of the vehicle than inflation portions adjacent to the front inflation portion in a front-rear direction of the vehicle.

WO 2012/111073A1 describes the third chamber that receives the driver's head moving toward the front pillar but fails to clarify specific configurations concerning how to integrate the third chamber into the curtain shield airbag main body, how to attach the third chamber to the vehicle body, and how to deploy and inflate the third chamber. Thus, disadvantageously, WO 2012/1110763A1 is unpractical.

In WO 2012/091656A1 and US Patent Application Publication No. 2008/0129023A1, the driver seat airbag and the passenger seat airbag protecting the driver and the occupant and the front inflation portions of the additional chamber and the side gas bag are in a positional relation in which the airbags interfere with the front inflation portions. Thus, disadvantageously, the interference may prevent exertion of a regular deploying and inflating function of the driver seat airbag or the like or sufficient deployment and inflation of the additional chamber or the like, precluding desired occupant protection performance from being provided.

With the above-described conventional problems in view, it is an object of the present invention to provide a vehicular curtain airbag apparatus that does not interfere with the driver seat airbag or the passenger seat airbag and that can appropriately provide the occupant protection performance either in a normal collision mode in which the driver and passenger seat airbags function or in a small-overlap mode, in which the curtain airbag has a simple airbag configuration and a simple structure for attachment to the vehicle, and to provide an attachment structure for the vehicular curtain airbag apparatus.

SUMMARY OF THE INVENTION

A vehicular curtain airbag apparatus according to the present invention has a vehicular curtain airbag that is deployed and inflated along a side surface portion of a vehicle interior from an upper side to a lower side of the side surface portion, this vehicular curtain airbag apparatus including: a main chamber formed in the curtain airbag and having a front end enabled to be deployed and inflated downward at a position near a front pillar of the vehicle; an additional chamber formed in the curtain airbag and positioned further toward a vehicle front side than the front end of the main chamber, the additional chamber being enabled to be deployed and inflated and being separated from the main chamber by a partition portion set between the front pillar and an inflation area of a driver seat airbag or a passenger seat airbag; and a communication portion formed in the partition portion so as to penetrate the partition portion thereby allowing the main chamber and the additional chamber to communicate with each other, wherein the additional chamber is folded back near the partition portion toward the vehicle interior and toward a rear of the vehicle so as to overlap the main chamber, and parts of a resultant overlapping portion corresponding to upper portions of the main and additional chambers or vicinities of these parts are coupled together to form a chamber coupling portion, and the additional chamber is deployed and inflated in a predetermined area in front of the inflation area of the driver seat airbag or the passenger seat airbag in the vehicle.

The chamber coupling portion is desirably formed by coupling together non-inflation portions provided at a periphery of the curtain airbag. The chamber coupling portion preferably includes a bridge member that bridges the main chamber and the additional chamber. The bridge member is desirably a tether. The chamber coupling portion is desirably formed by sewing or bonding.

The vehicular curtain airbag apparatus preferably includes a first tab that allows a vicinity of an upper end of the partition portion to be attached and fixed to the vehicle when the additional chamber is folded back near the partition portion toward the vehicle interior and toward the rear of the vehicle so as to overlap the main chamber. Desirably, the vehicular curtain airbag apparatus further includes an additional tab provided at an upper end of the additional chamber at a position away from the first tab, and the additional tab anchors the additional chamber to the vehicle when the additional chamber is laid on top of the main chamber.

Desirably, the curtain airbag includes a second tab that allows the main chamber to be attached and fixed to the vehicle near a position where the additional tab is anchored to the vehicle. Preferably, at least parts of the additional tab and the second tab are attached and fixed to the vehicle so as to overlap each other. Desirably, the additional chamber is folded back at a position in front of the partition portion in the vehicle.

A vehicular curtain airbag apparatus according to the present invention has a vehicular curtain airbag that is deployed and inflated along a side surface portion of a vehicle interior from an upper side to a lower side of the side surface portion, this vehicular curtain airbag apparatus including: a main chamber having a plurality of tabs disposed along an upper edge of the main chamber for attachment and fixation to the upper side of the side surface portion of the vehicle, a front end of the main chamber being enabled to be deployed and inflated downward at a position near a front pillar of the vehicle; an additional chamber positioned further toward a vehicle front side than the front end of the main chamber and enabled to be deployed and inflated, and separated from the main chamber by a partition portion set between the front pillar and an inflation area of a driver seat airbag or a passenger seat airbag; a communication portion formed in the partition portion so as to penetrate the partition portion thereby allowing the main chamber and the additional chamber to communicate with each other; and a first tab that allows a vicinity of an upper end of the partition portion to be attached and fixed to the vehicle when the additional chamber is folded back near the partition portion toward the vehicle interior and toward a rear of the vehicle so as to overlap the main chamber, wherein the additional chamber is deployed and inflated in a predetermined area in front of the inflation area of the driver seat airbag or the passenger seat airbag in the vehicle.

Preferably, the vehicular curtain airbag apparatus further includes an additional tab provided at an upper end of the additional chamber at a position away from the first tab, and the additional tab anchors the additional chamber to the vehicle when the additional chamber is laid on top of the main chamber.

Desirably, the plurality of tabs include a second tab that allows the main chamber to be attached and fixed to the vehicle near a position where the additional tab is anchored to the vehicle. Preferably, at least parts of the additional tab and the second tab are attached and fixed to the vehicle so as to overlap each other.

Preferably, the first tab is provided at a position at which the first tab is folded back together with the additional chamber in a vicinity of a position further toward a vehicle front side than the position, where the additional chamber is folded back.

Alternatively, the first tab is provided in a vicinity of a position further toward a vehicle rear side than the position, where the additional chamber is folded back.

Desirably, the vehicular curtain airbag apparatus includes a strap provided in front of the main chamber and having a front end coupled to the front pillar at a first attachment point to apply a tension to the main chamber when the main chamber is deployed. Preferably, the strap extends through an exterior side of the additional chamber and is coupled, at a rear end of the strap, to a second attachment point near the partition portion. Desirably, the second attachment point is set below the first attachment point.

Preferably, the first attachment point is set to include a horizontal second plane resulting from 30- to 50-mm downward parallel translation of a horizontal first plane extending through a break point that is a center of an impact expected area of the main chamber. Desirably, a center line of the strap in a width direction thereof lies within a range where the second plane can be present.

Preferably, the rear end of the strap is attached to the second attachment point by sewing, and a sewn portion is formed at a position away from a fold-back portion at which the additional chamber is laid on top of the main chamber. Desirably, the communication portion is positioned above a door trim line of the vehicle when the vehicular curtain airbag apparatus is deployed and inflated.

An attachment structure for a vehicular curtain airbag apparatus according to the present invention is used for a vehicular curtain airbag that is deployed and inflated along a side surface portion of a vehicle interior from an upper side to a lower side of the side surface portion, this attachment structure including: a main chamber having a plurality of tabs disposed along an upper edge of the main chamber for attachment and fixation to the upper side of the side surface portion of the vehicle, a front end of the main chamber being enabled to be deployed and inflated downward at a position near a front pillar of the vehicle; an additional chamber positioned further toward a vehicle front side than the front end of the main chamber and enabled to be deployed and inflated, and separated from the main chamber by a partition portion set between the front pillar and an inflation area of a driver seat airbag or a passenger seat airbag; a communication portion formed in the partition portion so as to penetrate the partition portion thereby allowing the main chamber and the additional chamber to communicate with each other; and a first tab that allows a vicinity of an upper end of the partition portion to be attached and fixed to the vehicle when the additional chamber is folded back near the partition portion toward the vehicle interior and toward a rear of the vehicle so as to overlap the main chamber, wherein, to allow the additional chamber to be deployed and inflated in a predetermined area in front of the inflation area of the driver seat airbag or the passenger seat airbag in the vehicle, the main chamber is attached and fixed to the vehicle with the plurality of tabs, and the vicinity of the upper end of the partition portion is attached and fixed to the vehicle with the first tab.

Preferably, the attachment structure further includes an additional tab provided at an upper end of the additional chamber at a position away from the first tab, and the additional tab anchors the additional chamber to the vehicle when the additional chamber is laid on top of the main chamber.

Desirably, the plurality of tabs include a second tab that allows the main chamber to be attached and fixed to the vehicle near a position where the additional tab is anchored to the vehicle. Preferably, at least parts of the additional tab and the second tab are attached and fixed to the vehicle so as to overlap each other.

Preferably, the first tab is provided at a position at which the first tab is folded back together with the additional chamber in a vicinity of a position further toward a vehicle front side than the position, where the additional chamber is folded back.

Alternatively, the first tab is provided in a vicinity of a position further toward a vehicle rear side than the position, where the additional chamber is folded back.

Desirably, the attachment structure includes a strap provided in front of the main chamber and having a front end coupled to the front pillar at a first attachment point to apply a tension to the main chamber when the main chamber is deployed.

Preferably, the strap extends through an exterior side of the additional chamber and is coupled, at a rear end of the strap, to a second attachment point near the partition portion. Desirably, the second attachment point is set below the first attachment point.

Preferably, the first attachment point is set to include a horizontal second plane resulting from 30- to 50-mm downward parallel translation of a horizontal first plane extending through a break point that is a center of an impact expected area of the main chamber. Desirably, a center line of the strap in a width direction thereof lies within a range where the second plane can be present.

Preferably, the rear end of the strap is attached to the second attachment point by sewing, and a sewn portion is formed at a position away from a fold-back portion at which the additional chamber is laid on top of the main chamber.

Desirably, the communication portion is positioned above a door trim line of the vehicle when the vehicular curtain airbag apparatus is deployed and inflated.

The vehicular curtain airbag apparatus and the attachment structure therefor according to the present invention do not interfere with a driver seat airbag or a passenger seat airbag and can appropriately provide the occupant protection performance either in a normal collision mode in which the driver and passenger seat airbags function or in a small-overlap mode. Furthermore, the curtain airbag and the attachment structure used to attach the airbag to the vehicle have simple configurations, enable productivity to be increased, and allow attachment operations to be more easily and efficiently performed. In the small overlap mode, at what angle the occupant rushes in is unknown. However, the first tab functions effectively in such a contingency situation to allow the occupant protection performance to be more reliably provided.

BRIEF DESCRIPTION OF THE DRAWINGS

FIG. 2A and FIG. 2B are diagrams illustrating a non-inflation state of a curtain airbag in the vehicular curtain airbag apparatus depicted in FIG. 1 where an additional chamber is folded back yet;

FIG. 3A and FIG. 3B are diagrams illustrating the deflated state of the curtain airbag in the vehicular curtain airbag apparatus depicted in FIG. 1 where the additional chamber has been folded back toward a vehicle interior of a main chamber;

FIGS. 8A and 8B are diagrams illustrating the deflated state of the alternative embodiment of the curtain airbag depicted in FIG. 7 where the additional chamber has been folded back toward the vehicle interior side of the main chamber;

FIGS. 10A-1 to 10A-4 and 10B-1 to 10B-5 are diagrams illustrating a collision of an impactor against a second cell in the vehicular curtain airbag apparatus in FIG. 1 or FIG. 7, compared to a collision in the case of a conventional vehicular curtain airbag apparatus;

FIGS. 13A and 13B are diagrams illustrating the results of evaluation tests on exterior ejection prevention performance;

DESCRIPTION OF THE PREFERRED EMBODIMENTS

A preferred embodiment of a vehicular curtain airbag apparatus and an attachment structure therefor according to the present invention will be described below with reference to the attached drawings.

Figure 1:
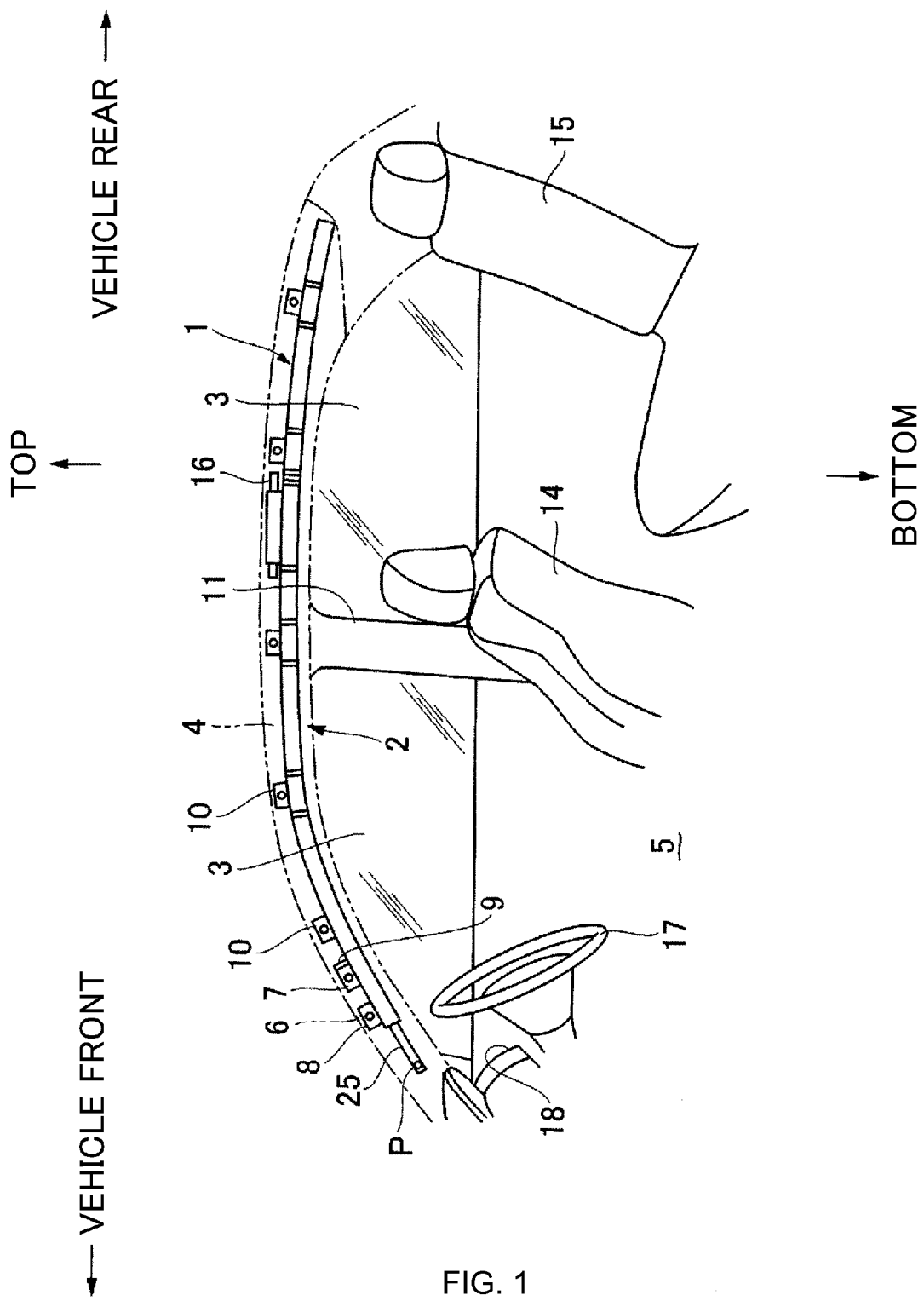
FIG. 1 is a side view depicting a preferred embodiment of a vehicular curtain airbag apparatus according to the present invention, illustrating a housed state of a curtain airbag that is attached and fixed to a vehicle.
Figure 4:
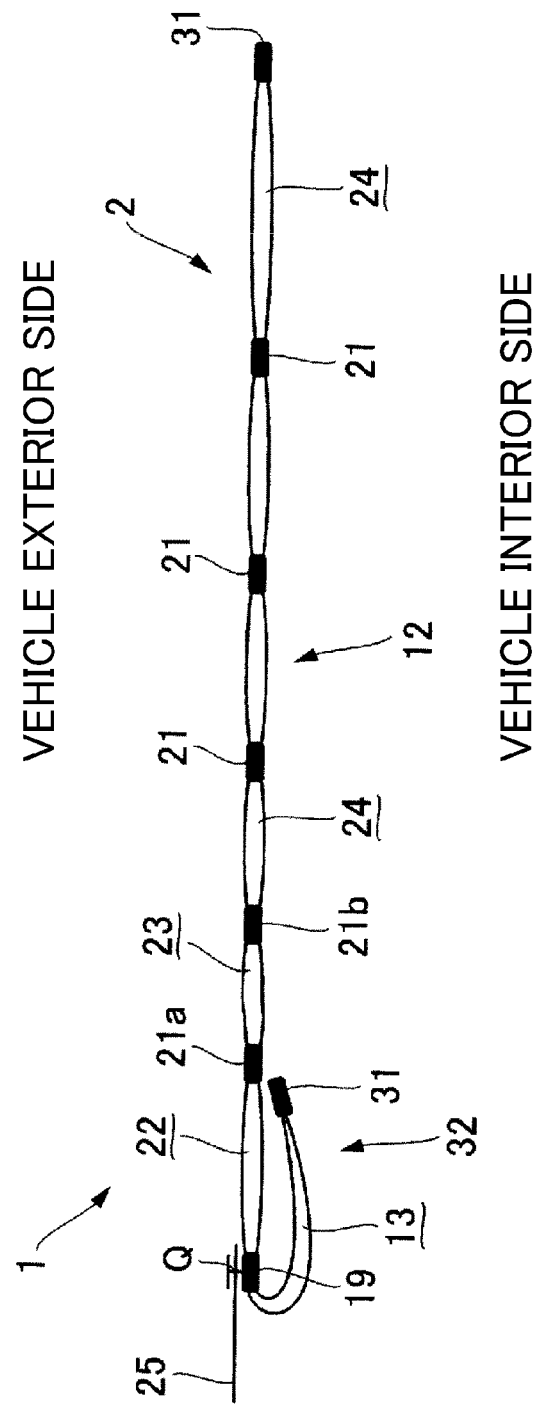
FIG. 4 is a sectional view of the curtain airbag taken along line B-B depicted by arrows in FIG. 3A.
Figure 5:
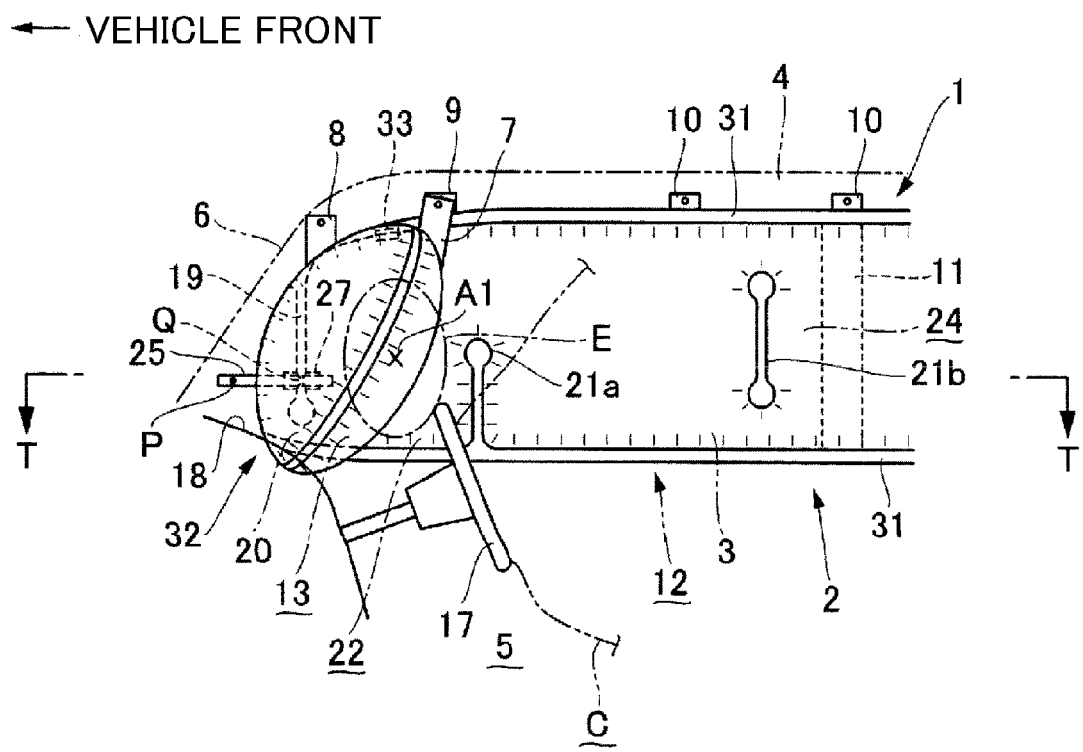
FIG. 5 is a front view illustrating an operative state of the vehicular curtain airbag apparatus depicted in FIG. 1.
Figure 6:
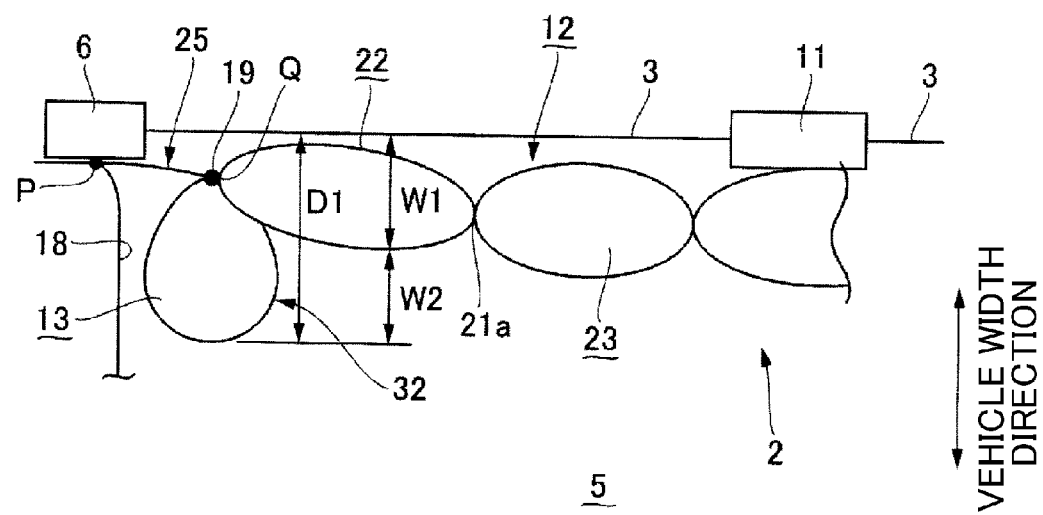
FIG. 6 is a sectional view taken along line T-T depicted by arrows in FIG. 5 and illustrating the operative state of the vehicular curtain airbag apparatus depicted in FIG. 1 as seen from above the vehicle interior.

FIG. 1 is a side view of a housed state of the vehicular curtain airbag apparatus according to the present embodiment that is attached and fixed to a vehicle. FIGS. 2A and 2B and FIGS. 3A and 3B are diagrams illustrating a non-inflation state of the vehicular curtain airbag apparatus according to the present embodiment. FIG. 2A is a front view of an additional chamber that is not folded back yet. FIG. 2B is a front view depicting an important part of a variation. FIG. 3A is a front view of the additional chamber that has been folded back toward a vehicle interior of a main chamber. FIG. 3B is a front view depicting an important part of a variation. FIG. 4 is a sectional view of the vehicular curtain airbag apparatus taken along line B-B depicted by arrows in FIG. 3A. FIG. 5 is a front view illustrating an operative state of the vehicular curtain airbag apparatus depicted in FIG. 1. FIG. 6 is a sectional view taken along line T-T depicted by arrows in FIG. 5 and illustrating the operative state of the vehicular curtain airbag apparatus depicted in FIG. 1 as seen from above a vehicle interior.

A curtain airbag 2 in a vehicular curtain airbag apparatus 1 is, as is well known, formed of a flexible cloth-like material and stored, in a housed state in which the curtain airbag 2 is rolled or folded, in a roof side rail 4 positioned above a side window 3 forming a side surface portion of a vehicle interior 5. A part of a vehicle front side of the curtain airbag 2 is stored in a front pillar 6 as needed.

Tabs 7, 8, 9, 10 are provided in the curtain airbag 2. The curtain airbag 2 is attached and fixed to the vehicle by attaching the tabs 7 to 10 to the roof side rail 4 or the like. When inflator gas is introduced into the curtain airbag 2, the curtain airbag 2 is deployed and inflated downward from the roof side rail 4 or the like along the side window 3. In the figures, a center pillar is depicted at 11.

The curtain airbag 2 of the vehicular curtain airbag apparatus 1 according to the present embodiment includes a main chamber 12 and an additional chamber 13 shaped like hollow chambers and defined by a non-inflation portion 3 formed all along an outer periphery of the curtain airbag 2 as depicted in FIGS. 2 to 6. The main chamber 12 portion is formed to have external dimensions sufficient to cover substantially the entire side window 3 of the vehicle from a driver seat 14 to a rear seat 15 on one side in a vehicle width direction and from a front occupant seat to the rear seat 15 on the other side in the vehicle width direction.

Inflator gas is fed into the main chamber 12 from an inflator 16 installed above the curtain airbag 2. When the inflator gas is fed into the main chamber 12, the main chamber 12 is deployed and inflated between the side window 3 of the vehicle and the occupant to receive and protect the occupant.

The main chamber 12 is formed such that the position of a front end of the main chamber 12 reaches at least a lateral side of steering wheel 17. Thus, the front end of the main chamber 12 can be deployed and inflated downward at a position near and in the rear of the front pillar 6 in the vehicle (see FIG. 5 and FIG. 6). Preferably, the front end of the main chamber 12 is formed to reach the vicinity of the front pillar 6 in front of the steering wheel 17 in the vehicle.

A driver seat airbag is stored in the steering wheel 17. A passenger seat airbag is stored in an instrument panel in front of the front occupant seat. As is well known, when the inflator gas is fed into the driver seat airbag and the passenger seat airbag, the driver seat airbag and the passenger seat airbag are deployed and inflated rearward in the vehicle to protect the driver and the occupant. In the driver seat airbag, an area extending rearward from the steering wheel 17 to the driver seat 14 defines an inflation area C (see FIG. 5 and FIG. 6). In the passenger seat airbag, an area extending rearward from the instrument panel to the front occupant seat forms an inflation area.

The additional chamber 13 portion of the curtain airbag 2 is provided in front of the front end of the main chamber 12 in the vehicle. The additional chamber 13 is formed to be continuous with the main chamber 12. The additional chamber 13 is formed to have a horizontal length dimension sufficient to cover substantially the entire space extending from the front end of the main chamber 12 via the front pillar 6 (see FIG. 5 and FIG. 6) position to the instrument panel 18 in front of the driver seat 14.

The additional chamber 13 is formed, on the front occupant seat side, to have a horizontal length dimension sufficient to cover substantially the entire space extending from the front end of the main chamber 12 via the front pillar 6 position to a lateral side of the instrument panel 18 in front of the front occupant seat. The additional chamber 13 is formed to have a height dimension sufficient to reach a position below the front pillar 6 and the instrument panel 18 to conceal the front pillar 6 and the instrument panel 18 from the occupant.

A partition portion 19 is formed between the additional chamber 13 and the main chamber 12 to separate the additional chamber 13 and the main chamber 12 from each other. The position of the partition portion 19 is set, on the driver seat 14 side, between the front pillar 6 and the inflation area C of the driver seat airbag. The position of the partition portion 19 is set, on the front occupant seat side, between the front pillar 6 and the inflation area of the passenger seat airbag.

The additional chamber 13 can be deployed and inflated independently of the main chamber 12 due to the partition portion 19. In the illustrated example, the partition portion 19 is formed to extend downward from an upper edge of the curtain airbag 2. The partition portion 19 may be formed to extend upward from a lower edge of the curtain airbag 2. The partition portion 19 may be formed to extend obliquely instead of extending upward or downward.

A communication portion 20 is formed in the partition portion 19 so as to penetrate the partition portion 19 to allow the main chamber 12 and the additional chamber 13 to communicate with each other. The communication portion 20 allows the inflator gas fed into the main chamber 12 to flow into the additional chamber 13. The additional chamber 13 is deployed and inflated when filled with the inflator gas flowing in from the main chamber 12.

Preferably, as depicted in FIG. 2A, the communication portion 20 is formed to lie above a door trim line K of the vehicle when the curtain airbag 2 is deployed and inflated. When the communication portion 20, into which the inflator gas flows, is positioned below the door trim line K, a flow of the inflator gas is hindered when the curtain airbag 2 is deployed and climbs onto a door trim. The flow of the inflator gas can be prevented from being hindered by providing the communication portion 20 such that the communication portion 20 is positioned above the door trim line K of the vehicle when the curtain airbag 2 is deployed. Therefore, to ensure that the inflator gas can be stably supplied even when the curtain airbag 2 climbs onto the door trim line K, the communication portion 20 is preferably positioned above the door trim line K.

In the example in FIGS. 2 to 6, six cells 22, 23, and 24 are formed in the main chamber 12 portion by five partitioning portions 21 (21a and 21b) arranged at intervals from the front to the rear of the vehicle. The six cells 22 to 24 are in communication with one another. All the cells 22 to 24 are filled with the inflator gas fed into the main chamber 12 to deploy and inflate the main chamber 12. The partitioning portions 21 are also non-inflation portions.

The partitioning portion 21 adjacent to and behind the partition portion 19 in the vehicle is referred to as a first partitioning portion 21a. The partitioning portion 21 adjacent to and behind the first partitioning portion 21a in the vehicle is referred to as a second partitioning portion 21b. The cell sandwiched between the first partitioning portion 21a and the partition portion 19 is referred to as a first cell 22. The cell sandwiched between the first partitioning portion 21a and the second partitioning portion 21b is referred to as a second cell 23. The first cell 22 is adjacent to the additional chamber 13.

In the illustrated example, the first partitioning portion 21a is formed to extend upward from the lower edge of the curtain airbag 2. The first partitioning portion 21a may be formed so as to extend downward from the upper edge of the curtain airbag 2 so long as the formation direction of the first partitioning portion 21*a* is different from the formation direction of the partition portion 19. The first partitioning portion 21*a* may be formed to extend obliquely instead of extending upward or downward.

As depicted in FIGS. 3(*a*) and (*b*), the additional chamber 13 is folded back near the partition portion 19 toward the vehicle interior 5 and toward the rear of the vehicle so as to overlap the main chamber 12. An overlapping portion 32 is formed in the curtain airbag 2. In the illustrated example, the additional chamber 13 is folded back so as to exactly overlap the first cell 22. However, the additional chamber 13 may be folded back over a range that is larger or sufficiently smaller than the first cell 22. In short, the additional chamber 13 may be folded back so as to partly overlap the main chamber 12 within the range where the additional chamber 13 does not interfere with the inflation area C of the driver seat airbag or the inflation area of the passenger seat airbag such that the additional chamber 13 is deployed and inflated in a predetermined area in front of the inflation area C of the driver seat airbag or the front occupant seat in the vehicle.

In other words, the position of the overlapping portion 32 of the curtain airbag 2 is set within the range where the overlapping portion 32 does not interfere with the deployment area C of the driver seat airbag or the deployment area of the passenger seat airbag. A chamber coupling portion 33 is formed on the overlapping portion 32 of the curtain airbag 2 to couple upper portions of the additional chamber 13 and the main chamber 12 or vicinities of the upper portions together (see FIGS. 3(*a*) and (*b*)). Formation expected areas of the chamber coupling portion 33 are denoted by 33*a* and 33*b* in FIG. 2.

The chamber coupling portion 33 may be formed by coupling cloth materials of the additional chamber 13 and the main chamber 12 that face each other when the additional chamber 13 is folded back or joining non-inflation portions 31 provided at a periphery of the curtain airbag 2, for example, the non-inflation portions that face each other when the additional chamber 13 is folded back (the non-inflation portions 31 define the chambers 12 and 13). In the illustrated example, the chamber coupling portion 33 is set at the non-inflation portion 31 along the upper edge of the curtain airbag 2.

The chamber coupling portion 33 produces a coupling effect and ensures that the additional chamber 13 and the first cell 22 are positioned in the vehicle interior 5 such that the additional chamber 13 and the first cell 22 overlap each other in front of the steering wheel 17 in the vehicle when the additional chamber 13 and the first cell 22 are deployed and inflated.

The chamber coupling portion 33 may be formed by sewing or bonding the non-inflation portions 31 or the like together. As the non-inflation portions 31 forming the chamber coupling portion 33, the non-inflation portion 31 extending along a front edge of the curtain airbag 2 or the first partitioning portion 21*a* may be utilized.

The fold-back position is set near and in front of the partition portion 19 in the vehicle so as to allow the first cell 22 in the main chamber 12 to be appropriately and sufficiently deployed and inflated. Thus, the additional chamber 13 is laid on top of the main chamber 12 such that the first cell 22 lies on a vehicle exterior side, whereas the additional chamber 13 lies on the vehicle interior 5 side.

The plurality of tabs 7 to 10 spaced apart from one another are provided at the upper edge of the curtain airbag 2 along a front-rear direction the vehicle to allow the curtain airbag 2 to be attached and fixed to the roof side rail 4 and the front pillar 6 of the vehicle.

At least one of the tabs provided at the upper end of the additional chamber 13 is referred to as an additional tab 7. The additional tab 7 is attached and fixed to the roof side rail 4 or the front pillar 6 to anchor the folded-back additional chamber 13 to the vehicle.

The tab provided near an upper end of the partition portion 19 is referred to as a first tab 8. The first tab 8 allows the vicinity of an upper portion of the partition portion 19 to be attached and fixed to the roof side rail 4 or the front pillar 6. The additional tab 7 is provided at the upper end of the additional chamber 13 at a position away from the first tab 8. In the illustrated example, the additional tab 7 is attached and fixed to the vehicle in the rear of the first tab 8 in the vehicle. More specifically, the first tab 8 allows the vicinity of the upper end of the partition portion 19 to be attached and fixed to the vehicle when the additional chamber 13 is folded back near the partition portion 19 toward the vehicle interior 5 and toward the rear of the vehicle so as to overlap the main chamber 12. As depicted in FIG. 3A, the first tab 8 is provided near and in the rear of a fold-back position (fold-back line) J in the additional chamber 13 in the vehicle. Alternatively, as depicted in FIG. 3B, the first tab 8 may be provided near and in front the fold-back position J in the additional chamber 13 in the vehicle at a position where the first tab 8 is folded back along with the additional chamber 13. In this manner, the first tab 8 is not provided at the fold-back position J but away from the fold-back position J. Even if a part of the first tab 8 is located at the fold-back position J, the first tab 8, when folded back, has a bent portion. When the first tab 8 has a bent portion, the bending of the first tab 8 may interfere with an end of the curtain airbag 2 housed by being wound or folded into a roll, precluding predetermined deploying behavior from being performed to make the deployment unstable. The first tab 8 provided away from the fold-back position of the additional chamber 13 allows a deploying capability to be stabilized.

The first tab 8 is positioned at a front end of the main chamber 12 in the curtain airbag 2. The first tab 8 allows upper portions of front ends of both the additional chamber 13 and the main chamber 12 to be fixed to the vehicle when the curtain airbag 2 is deployed. This attachment structure allows a protect area to be effectively extended to the front ends of both the additional chamber 13 and the main chamber 12.

The tab located near a position where the additional tab 7 is anchored to the vehicle is referred to as a second tab 9. The second tab 9 allows the main chamber 12 to be attached and fixed to the vehicle. At least parts of the additional tab 7 and the second tab 9 are attached and fixed to the vehicle so as to overlap each other. Specifically, the additional tab 7 and the second tab 9 at least partly overlap each other. The additional tab 7 and the second tab 9 are coupled together, the additional tab 7 or the vicinity thereof is coupled, near the second tab 9, to the upper edge of the curtain airbag 2 corresponding to the upper portion of the main chamber 12, or the second tab 9 or the viscosity thereof is coupled, near the additional tab 7, to the upper edge of the curtain airbag 2 corresponding to the upper portion of the folded-back additional chamber 13, as needed. The fixed attachment to the vehicle is performed at multiple positions (over a wide range) via the tabs 7 to 9 to allow occupant protection performance to be enhanced.

The curtain airbag 2 in the vehicular curtain airbag apparatus 1 according to the present embodiment is provided with a strap 25 as depicted in FIGS. 1 to 6. The strap 25 is a band-like member attached to the front pillar 6 at a leading end of the strap 25, extending on the vehicle exterior side of the additional chamber 13, and then attached, on the vehicle exterior side, to the partition portion 19 at a trailing end of the strap 25.

In the curtain airbag 2, the trailing end of the strap 25 is attached to the partition portion 19 behind the additional chamber 13 as depicted in FIG. 6. The behavior of the curtain airbag 2 during deployment varies with the size of the curtain airbag 2 and the position where the curtain airbag 2 is attached to the roof side rail 4. In this regard, the partition portion 19 is assumed to move rearward from the original position in the vehicle as viewed above when the curtain airbag 2 in a rolled state is deployed and inflated. In this case, the length of the strap 25 is set shorter than a length from a position on the front pillar 6 where the leading end of the strap 25 is attached to the front pillar 6 to a position to which the partition portion 19 is to move in conjunction with the deployment and inflation of the curtain airbag 2. In other words, the length of the strap 25 is short enough to hinder the partition portion 19 from moving to the target position.

Thus, the partition portion 19 is locked by the substantially linear strap 25 and actually precluded from moving to a position to which the partition portion 19 is to move. On the other hand, after deployment and inflation, the strap 25 is substantially linearly tensed so as to be pulled rearward in the vehicle by the partition portion 19.

A distance from the side window 3 to a surface of the first cell 22 located closest to the vehicle interior 5 after deployment is denoted by W1, and a distance from the surface of the first cell 22 located closest to the vehicle interior to an end of the additional chamber 13 located closest to the vehicle interior is denoted by W2 (see FIG. 6). In the curtain airbag 2, the distance of protrusion D1 from the side window 3 to the vehicle interior-side end of the additional chamber 13 is equal to sum of the distance W1 and the distance W2 (W1+W2) as depicted in FIG. 6. Thus, the vicinity of the front end of the curtain airbag 2 can be deployed and inflated at a more inward position in the vehicle interior 5 than when the curtain airbag 2 is simply deployed and inflated along the side window 3.

As described above, in the curtain airbag 2 in the vehicular curtain airbag apparatus 1 according to the present embodiment, the additional chamber 13 protrudes (moves) far into the first cell 22 toward the vehicle interior 5. In other words, in the curtain airbag 2 applied to the present embodiment, as described above, the strap 25 attached to the front pillar 6 and the partition portion 19 at a position closer to the vehicle exterior than the additional chamber 13 appropriately tenses the additional chamber 13, the surrounding first cell 22 and second cell 23, and the like in the front-rear direction of the vehicle during deployment and inflation. The curtain airbag 2 is fixed to the vehicle with the first tab 8 at a front end of the first cell 22 located at the front ends of the additional chamber 13 and the main chamber 12. Thus, the additional chamber 13 and the first cell 22 appropriately exert a reaction force to allow impact to be quickly and optimally absorbed when the curtain airbag 2 comes into contact with the occupant. Specifically, restraint of the impactor (occupant) starts at the position W1 in the conventional airbag, but at the position corresponding to the distance (W1+W2) and involving the additional chamber 13 in the present embodiment. The provision of the first tab 8 at the front end allows the entire distance (W1+W2) to function effectively.

Figures 7A, 7B:
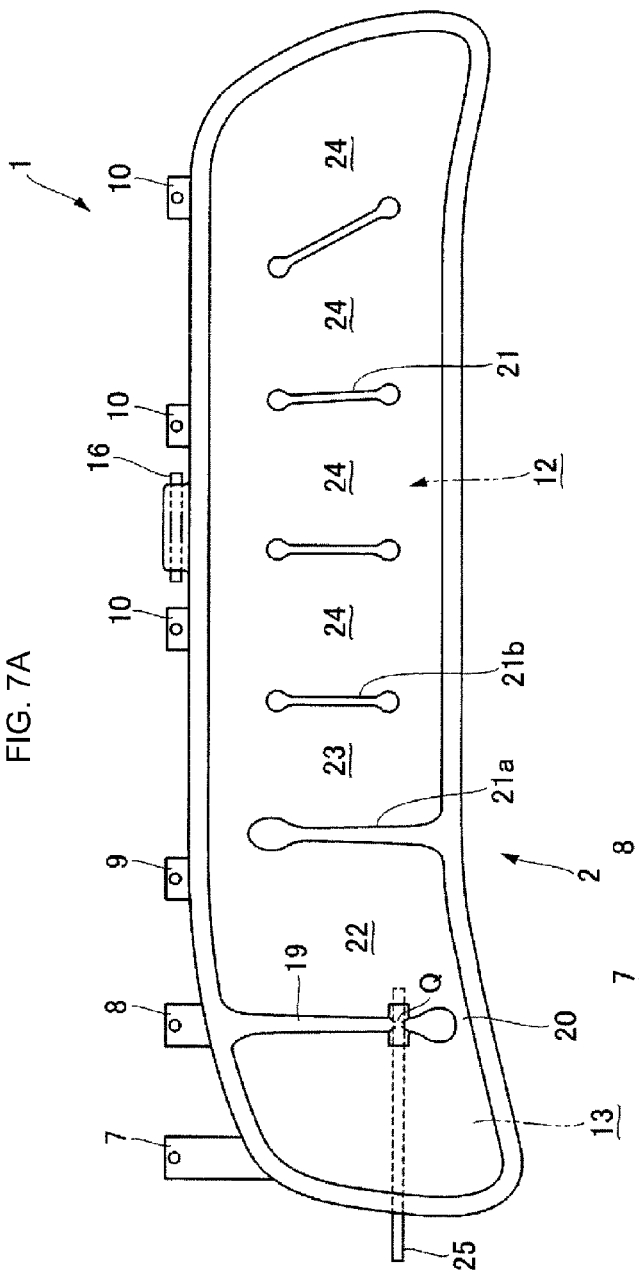
FIGS. 7A and 7B are diagrams of an alternative embodiment of the vehicular curtain airbag apparatus depicted in FIG. 1, illustrating the deflated state where the additional chamber is not folded back yet.

FIGS. 7A and 7B and FIGS. 8A and 8B depict an alternative embodiment of the curtain airbag in the vehicular curtain airbag apparatus according to the present invention. FIGS. 7A and 7B and FIGS. 8A and 8B all illustrate a non-inflation state. FIG. 7A is a front view depicting the additional chamber that is not folded back yet. FIG. 7B is a front view of an important part of a variation of the additional chamber. FIG. 8A is a front view depicting the additional chamber that has been folded back toward the vehicle interior side of the main chamber. FIG. 8B is a front view of an important part of a variation of the additional chamber.

A curtain airbag 2 in the alternative embodiment includes a main chamber 12 and an additional chamber 13 shaped like hollow chambers as depicted in FIG. 7 and FIG. 8. The main chamber 12 portion is formed to have external dimensions sufficient to cover substantially the entire side window 3 of the vehicle from a driver seat 14 to a rear seat 15 on one side in a vehicle width direction and from a front occupant seat to the rear seat 15 on the other side in the vehicle width direction.

Inflator gas is fed into the main chamber 12 from an inflator 16 installed above the curtain airbag 2. When the inflator gas is fed into the main chamber 12, the main chamber 12 is deployed and inflated between the side window 3 of the vehicle and the occupant to receive and protect the occupant.

The main chamber 12 is formed such that the position of a front end of the main chamber 12 reaches at least a lateral side of steering wheel 17. Thus, the front end of the main chamber 12 can be deployed and inflated downward at a position near and in the rear of the front pillar 6 in the vehicle (similarly to the above-described curtain airbag 2; see FIG. 5 and FIG. 6). Preferably, the front end of the main chamber 12 is formed to reach the vicinity of the front pillar 6 in front of the steering wheel 17 in the vehicle.

A driver seat airbag is stored in the steering wheel 17. A passenger seat airbag is stored in an instrument panel in front of the front occupant seat. As is well known, when the inflator gas is fed into the driver seat airbag and the passenger seat airbag, the driver seat airbag and the passenger seat airbag are deployed and inflated rearward in the vehicle to protect the driver and the occupant. In the driver seat airbag, an area extending rearward from the steering wheel 17 to the driver seat 14 defines an inflation area C (similarly to the above-described curtain airbag 2; see FIG. 5 and FIG. 6). In the passenger seat airbag, an area extending rearward from the instrument panel to the front occupant seat forms an inflation area.

The additional chamber 13 portion of the curtain airbag 2 is provided in front of the front end of the main chamber 12 in the vehicle. The additional chamber 13 is formed to be continuous with the main chamber 12. The additional chamber 13 is formed to have a horizontal length dimension sufficient to cover substantially the entire space extending from the front end of the main chamber 12 via the front pillar 6 (similarly to the above-described curtain airbag 2; see FIG. 5 and FIG. 6) position to the instrument panel 18 in front of the driver seat 14.

The additional chamber 13 is formed, on the front occupant seat side, to have a horizontal length dimension sufficient to cover substantially the entire space extending from the front end of the main chamber 12 via the front pillar 6 position to a lateral side of the instrument panel 18 in front of the front occupant seat. The additional chamber 13 is formed to have a height dimension sufficient to reach a position below the front pillar 6 and the instrument panel 18 to conceal the front pillar 6 and the instrument panel 18 from the occupant.

A partition portion 19 is formed between the additional chamber 13 and the main chamber 12 to separate the additional chamber 13 and the main chamber 12 from each other. The position of the partition portion 19 is set, on the driver seat 14 side, between the front pillar 6 and the inflation area C of the driver seat airbag. The position of the partition portion 19 is set, on the front occupant seat side, between the front pillar 6 and the inflation area of the passenger seat airbag.

The additional chamber 13 can be deployed and inflated independently of the main chamber 12 due to the partition portion 19. In the illustrated example, the partition portion 19 is formed to extend downward from an upper edge of the curtain airbag 2. The partition portion 19 may be formed to extend upward from a lower edge of the curtain airbag 2. The partition portion 19 may be formed to extend obliquely instead of extending upward or downward.

A communication portion 20 is formed in the partition portion 19 so as to penetrate the partition portion 19 to allow the main chamber 12 and the additional chamber 13 to communicate with each other. The communication portion 20 allows the inflator gas fed into the main chamber 12 to flow into the additional chamber 13. The additional chamber 13 is deployed and inflated when filled with the inflator gas flowing in from the main chamber 12.

Preferably, as depicted in FIG. 7B, the communication portion 20 is formed to lie above a door trim line K of the vehicle when the curtain airbag 2 is deployed and inflated. When the communication portion 20, into which the inflator gas flows, is positioned below the door trim line K, a flow of the inflator gas is hindered when the curtain airbag 2 is deployed and climbs onto a door trim. The flow of the inflator gas can be prevented from being hindered by providing the communication portion 20 such that the communication portion 20 is positioned above the door trim line K of the vehicle when the curtain airbag 2 is deployed. Therefore, to ensure that the inflator gas can be stably supplied even when the curtain airbag 2 climbs onto the door trim line K, the communication portion 20 is preferably positioned above the door trim line K.

In the example in FIGS. 7A and 7B and FIGS. 8A and 8B, six cells 22, 23, and 24 are formed in the main chamber 12 portion by five partitioning portions 21 (21*a* and 21*b*) arranged at intervals from the front to the rear of the vehicle. The six cells 22 to 24 are in communication with one another. All the cells 22 to 24 are filled with the inflator gas fed into the main chamber 12 to deploy and inflate the main chamber 12.

The partitioning portion adjacent to the partition portion 19 in a front-rear direction of the vehicle is referred to as a first partitioning portion 21*a*. The partitioning portion adjacent to the first partitioning portion 21*a* in the front-rear direction of the vehicle is referred to as a second partitioning portion 21*b*. The cell sandwiched between the first partitioning portion 21*a* and the partition portion 19 is referred to as a first cell 22. The cell sandwiched between the first partitioning portion 21*a* and the second partitioning portion 21*b* is referred to as a second cell 23. The first cell 22 is adjacent to the additional chamber 13.

In the illustrated example, the first partitioning portion 21*a* is formed to extend upward from the lower edge of the curtain airbag 2. The first partitioning portion 21*a* may be formed so as to extend downward from the upper edge of the curtain airbag 2 so long as the formation direction of the first partitioning portion 21*a* is different from the formation direction of the partition portion 19. The first partitioning portion 21*a* may be formed to extend obliquely instead of extending upward or downward.

As depicted in FIGS. 8A and 8B, the additional chamber 13 is folded back near the partition portion 19 toward the vehicle interior 5 and toward the rear of the vehicle so as to overlap the main chamber 12. In the illustrated example, the additional chamber 13 is folded back so as to exactly overlap the first cell 22. However, the additional chamber 13 may be folded back over a range that is larger or sufficiently smaller than the first cell 22. In short, the additional chamber 13 may be folded back so as to partly overlap the main chamber 12 within the range where the additional chamber 13 does not interfere with the inflation area C of the driver seat airbag or the inflation area of the passenger seat airbag such that the additional chamber 13 is deployed and inflated in a predetermined area in front of the inflation area C of the driver seat airbag or the passenger seat airbag in the vehicle.

The fold-back position is set near and in front of the partition portion 19 in the vehicle so as to allow the first cell 22 in the main chamber 12 to be appropriately and sufficiently deployed and inflated. Thus, the additional chamber 13 is laid on top of the main chamber 12 such that the first cell 22 lies on a vehicle exterior side, whereas the additional chamber 13 lies on the vehicle interior 5 side.

A plurality of tabs 7 to 10 spaced apart from one another are provided at the upper edge of the curtain airbag 2 along the front-rear direction the vehicle to allow the curtain airbag 2 to be attached and fixed to the roof side rail 4 and the front pillar 6 of the vehicle.

At least one of the tabs provided at the upper end of the additional chamber 13 is referred to as an additional tab 7. The additional tab 7 is attached and fixed to the roof side rail 4 or the front pillar 6 to anchor the folded-back additional chamber 13 to the vehicle.

The tab provided near an upper end of the partition portion 19 is referred to as a first tab 8. The first tab 8 allows the vicinity of an upper portion of the partition portion 19 to be attached and fixed to the roof side rail 4 or the front pillar 6. The additional tab 7 is provided at the upper end of the additional chamber 13 at a position away from the first tab 8. In the illustrated example, the additional tab 7 is attached and fixed to the vehicle in the rear of the first tab 8 in the vehicle. More specifically, the first tab 8 allows the vicinity of the upper end of the partition portion 19 to be attached and fixed to the vehicle when the additional chamber 13 is folded back near the partition portion 19 toward the vehicle interior 5 and toward the rear of the vehicle so as to overlap the main chamber 12. As depicted in FIG. 8A, the first tab 8 is provided near and in the rear of a fold-back position (fold-back line) J in the additional chamber 13 in the vehicle. Alternatively, as depicted in FIG. 8B, the first tab 8 may be provided near and in front the fold-back position J in the additional chamber 13 in the vehicle at a position where the first tab 8 is folded back along with the additional chamber 13. In this manner, the first tab 8 is not provided at the fold-back position J but away from the fold-back position J. Even if a part of the first tab 8 is located at the fold-back position J, the first tab 8, when folded back, has a bent portion. When the first tab 8 has a bent portion, the bending of the first tab 8 may interfere with an end of the curtain airbag 2 housed by being wound or folded into a roll, precluding predetermined deploying behavior from being performed to make the deployment unstable. The first tab 8 provided away from the fold-back position of the additional chamber 13 allows a deploying capability to be stabilized.

The first tab 8 is positioned at a front end of the main chamber 12 in the curtain airbag 2. The first tab 8 allows upper portions of front ends of both the additional chamber 13 and the main chamber 12 to be fixed to the vehicle when the curtain airbag 2 is deployed. This attachment structure allows a protect area to be effectively extended to the front ends of both the additional chamber 13 and the main chamber 12.

The tab located near a position where the additional tab 7 is anchored to the vehicle is referred to as a second tab 9. The second tab 9 allows the main chamber 12 to be attached and fixed to the vehicle. At least parts of the additional tab 7 and the second tab 9 are attached and fixed to the vehicle so as to overlap each other. Specifically, the additional tab 7 and the second tab 9 at least partly overlap each other. The additional tab 7 and the second tab 9 are coupled together, the additional tab 7 or the vicinity thereof is coupled, near the second tab 9, to the upper edge of the curtain airbag 2 corresponding to the upper portion of the main chamber 12, or the second tab 9 or the viscosity thereof is coupled, near the additional tab 7, to the upper edge of the curtain airbag 2 corresponding to the upper portion of the folded-back additional chamber 13. The fixed attachment to the vehicle is performed at multiple positions (over a wide range) via the tabs 7 to 9 to allow the occupant protection performance to be enhanced.

The curtain airbag 2 in the vehicular curtain airbag apparatus 1 according to the alternative embodiment is provided with a strap 25 as is the case with the above-described embodiment (see FIGS. 1 to 6). The strap 25 is a band-like member attached to the front pillar 6 at a leading end of the strap 25, extending on the vehicle exterior side of the additional chamber 13, and then attached, on the vehicle exterior side, to the partition portion 19 at a trailing end of the strap 25.

In the curtain airbag 2, the trailing end of the strap 25 is attached to the partition portion 19 behind the additional chamber 13 (see FIG. 6). The behavior of the curtain airbag 2 during deployment varies with the size of the curtain airbag 2 and the position where the curtain airbag 2 is attached to the roof side rail 4. In this regard, the partition portion 19 is assumed to move rearward from the original position in the vehicle as viewed above when the curtain airbag 2 in a rolled state is deployed and inflated. In this case, the length of the strap 25 is set shorter than a length from a position on the front pillar 6 where the leading end of the strap 25 is attached to the front pillar 6 to a position to which the partition portion 19 is to move in conjunction with the deployment and inflation of the curtain airbag 2. In other words, the length of the strap 25 is short enough to hinder the partition portion 19 from moving to the target position.

Thus, the partition portion 19 is locked by the substantially linear strap 25 and actually precluded from moving to a position to which the partition portion 19 is to move. On the other hand, after deployment and inflation, the strap 25 is substantially linearly tensed so as to be pulled rearward in the vehicle by the partition portion 19.

A distance from the side window 3 to a surface of the first cell 22 located closest to the vehicle interior after deployment is denoted by W1, and a distance from the surface of the first cell 22 located closest to the vehicle interior to an end of the additional chamber 13 located closest to the vehicle interior is denoted by W2 (see FIG. 6). In the curtain airbag 2, the distance of protrusion D1 from the side window 3 to the vehicle interior-side end of the additional chamber 13 is equal to sum of the distance W1 and the distance W2 (W1+W2). Thus, the vicinity of the front end of the curtain airbag 2 can be deployed and inflated at a more inward position in the vehicle interior 5 than when the curtain airbag 2 is simply deployed and inflated along the side window 3.

As described above, also in the curtain airbag 2 in the vehicular curtain airbag apparatus 1 according to the alternative embodiment, the additional chamber 13 protrudes (moves) far into the first cell 22 toward the vehicle interior 5. In other words, in the curtain airbag 2 applied to the alternative embodiment, as described above, the strap 25 attached to the front pillar 6 and the partition portion 19 at a position closer to the vehicle exterior than the additional chamber 13 appropriately tenses the additional chamber 13, the surrounding first cell 22 and second cell 23, and the like in the front-rear direction of the vehicle during deployment and inflation. The curtain airbag 2 is fixed to the vehicle with the first tab 8 at a front end of the first cell 22 located at the front ends of the additional chamber 13 and the main chamber 12. Thus, the additional chamber 13 and the first cell 22 appropriately exert a reaction force to allow impact to be quickly and optimally absorbed when the curtain airbag 2 comes into contact with the occupant. Specifically, restraint of an impactor (occupant) starts at the position W1 in the conventional airbag, but at the position corresponding to the distance (W1+W2) and involving the additional chamber 13 also in the alternative embodiment. The provision of the first tab 8 at the front end allows the entire distance (W1+W2) to function effectively.

Figure 9:
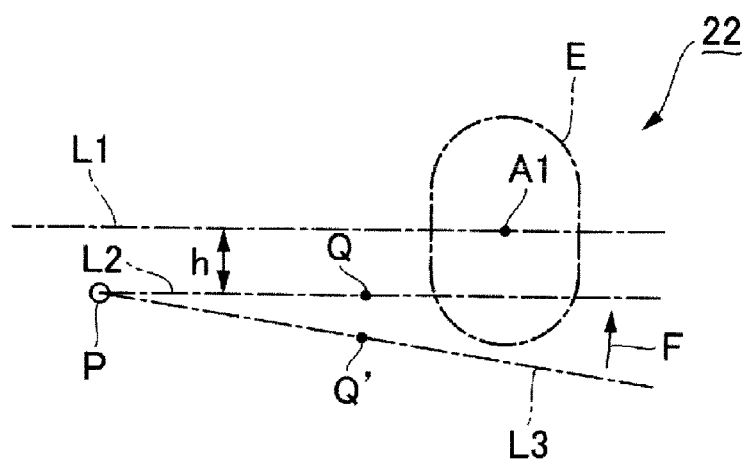
FIG. 9 is a diagram schematically depicting the position of a strap in the vehicular curtain airbag apparatus in FIG. 1 or FIG. 7.

The attachment position of the strap 25 will be described below with reference to FIG. 9. The description below is common to the curtain airbag 2 in the embodiment depicted in FIG. 2 and FIG. 3 and to the curtain airbag 2 in the alternative embodiment depicted in FIG. 7 and FIG. 8. FIG. 9 is a diagram schematically depicting the position of the strap 25.

The first cell 22 and the additional chamber 13 overlap an impact expected area E (see FIG. 5). The impact expected area E is an area specified with reference to a window frame as a collision target for an impactor 26 (see FIG. 10) in evaluation tests on exterior ejection prevention performance based on the US federal motor vehicle safety standard (FMVSS). The impactor 26 is a test apparatus shaped like an occupant and caused to collide, in the vehicle interior, against an airbag to be tested.

During side impact tests based on the FMVSS, the impactor 26, which is a test apparatus, is caused to collide against a predetermined break point set on the curtain airbag 2, allowing safety to be evaluated (evaluation tests on exterior ejection prevention performance). In particular, a break point (impact expected area E) at the foremost position of the side window 3 is referred to as an A1 break point. As is understood from FIG. 5, the additional chamber 13 is present on a trajectory of the impactor 26, and thus, a high impact absorption effect can be produced even during initial restraint.

As depicted in FIG. 5, the leading end of the strap 25 is attached to the front pillar 6 at a first attachment point P. In other words, the first attachment point P is set on the front pillar 6. The trailing end of the strap 25 is attached to the partition portion 19 at a second attachment point Q on the vehicle exterior side of the additional chamber 13. The partition portion 19 includes a wide portion 27 that is wider than the periphery of the partition portion 19 and that includes the second attachment point Q. In other words, the second attachment point Q is set on the partition portion 19. The wide portion 27 is exaggerated in FIG. 5. In FIG. 9, the front pillar 6 and the partition portion 19 are omitted.

As depicted in FIG. 9, the first attachment point P is set to include a second plane L2 resulting from a distance h (for example, 40 mm) of downward parallel translation of a first plane L1.

The first plane L1 refers to a plane orthogonal to the vertical direction of the vehicle and that is an aggregate of lines parallel to one another in the front-rear direction of the vehicle. The first plane L1 includes a line that traverses, when the curtain airbag 2 is deployed, the A1 break point, which is the center of the impact expected area E in the curtain airbag 2, which overlaps the first cell 22. The second plane L2 refers to a plane orthogonal to the vertical direction of the vehicle and that is an aggregate of lines parallel to one another in the front-rear direction of the vehicle. The second plane L2 includes a line that traverses, when the curtain airbag 2 is deployed, a point resulting from downward movement by only a distance h, in the vehicle, from the A1 break point, which is the center of the impact expected area E in the curtain airbag 2.

In the above description, the distance h is 40 mm. However, the embodiments are not limited to this, and the distance h may be set to any value within the range of 30 to 50 mm as needed. The present inventors examined the range within which the distance of exterior ejection was reduced in the evaluation tests on exterior ejection prevention performance with the distance (h) set to an appropriate value (this will be described in detail with reference to FIG. 13).

As depicted in FIG. 9, the trailing end of the strap 25 is attached to the second attachment point Q, which is set to include the second plane L2, as is the case with the first attachment point P. However, the embodiments are not limited to this. By way of example, the trailing end of the strap 25 may be attached to the partition portion 19 at a second attachment point Q' located downward away from the second attachment point Q as depicted in FIG. 9. As typified by the second attachment points Q and Q', the second attachment point preferably has a height equal to or smaller than the height of the first attachment point P during deployment and inflation of the first cell 22.

When the trailing end of the strap 25 is attached to the second attachment point Q', the strap 25 is positioned to include a third plane L3 extending obliquely downward from the first attachment point P on the second plane L2 when the first cell 22 is deployed and inflated. As described below, after the first cell 22 is deployed and inflated and before the first cell 22 partly moves out of the vehicle by being pushed toward the vehicle exterior by the impactor 26, the second attachment point Q' may move onto the second plane L2 or the vicinity thereof, as indicated by an arrow F in the figure. At this time, the first attachment point P and the second attachment point Q' are positioned to include the second plane L2, and thus, the strap 25 is level along the front-rear direction of the vehicle.

Now, with reference to FIG. 10 and FIG. 11, a case will be described where the impactor 26 collides against the first cell 22. FIGS. 10A-1 to 10A-4 are schematic diagrams illustrating the impactor 26 colliding against the first cell 22 in FIG. 5. FIGS. 10B-1 to 10B-5 are schematic diagrams illustrating the impactor 26 colliding against a conventional vehicular curtain airbag apparatus M. FIG. 10A-1 illustrates the impactor 26 moving from the vehicle interior side to come into contact with the additional chamber 13 on the vehicle interior side. FIG. 10A-2 illustrates the impactor 26 depicted in FIG. 10A-1 moving toward the vehicle exterior side. FIG. 10A-3 illustrates the impactor 26 depicted in FIG. 10A-2 further moving toward the vehicle exterior side. FIG. 10A-4 illustrates the impactor 26 depicted in FIG. 10A-3 further moving toward the vehicle exterior side. FIG. 10B-1 illustrates the impactor 26 approaching the conventional vehicular curtain airbag apparatus M at a timing in FIG. 10A-1. FIG. 10B-2 illustrates the impactor 26 in contact with the conventional vehicular curtain airbag apparatus from the vehicle interior side at a timing in FIG. 10A-2. FIG. 10B-3 illustrates the impactor 26 moving toward the vehicle exterior side at a timing in FIG. 10A-3. FIG. 10B-4 illustrates the impactor 26 further moving toward the vehicle exterior side at a timing in FIG. 10A-4. FIG. 10B-5 illustrates the impactor 26 further moving toward the vehicle exterior side at a timing in FIG. 10B-4. Coordinates representing displacement of a head of the impactor 26 are denoted by X0, X1, X2, X3 and X4 in FIGS. 10A-1 to 10B-5, as also depicted in FIG. 11.

Figure 11:
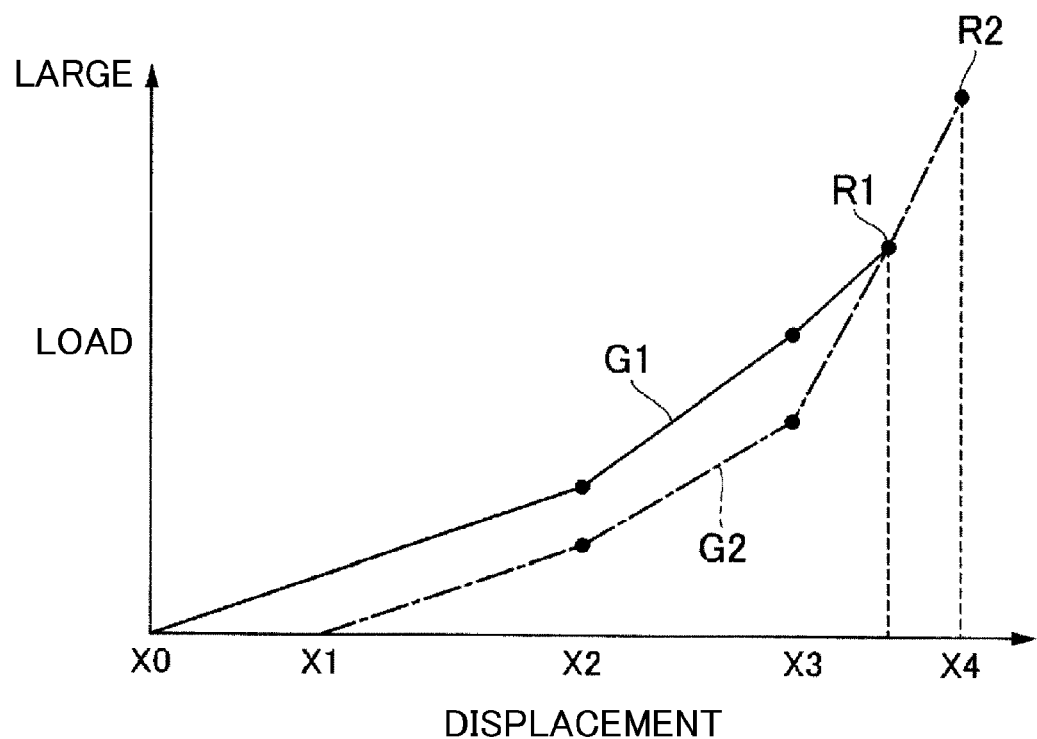
FIG. 11 is a graph schematically illustrating a relation between displacement of the impactor and a load imposed on the impactor.

FIG. 11 is a graph schematically illustrating the relation between the displacement of the impactor 26 in FIG. 10 and a load on the impactor 26. The load in this case refers to a reaction force exerted on the impactor 26 by the first cell 22 and the additional chamber 13 or the conventional vehicular curtain airbag apparatus M. In FIG. 11, a graph G1 depicted by a solid line represents the relation between the displacement and the load in the present embodiment with the additional chamber 13 and the first tab 8 attached to the curtain airbag. A graph G2 depicted by a dot-dashed line represents the relation between the displacement and the load in the conventional vehicular curtain airbag apparatus M not having the additional chamber 13 or the first tab 8. Peaks of the loads are illustrated by points R1 and R2 depicted on the graphs G1 and G2.

As described above, the additional chamber 13 is deployed and inflated on the vehicle interior 5 side of the additional chamber 13 during deployment and inflation. Therefore, in this case, the impactor 26 starts to come into contact with the additional chamber 13 earlier than in the case of the conventional vehicular curtain airbag apparatus M. At a point with coordinate X0, the load is zero. Graph G1 in FIG. 11 illustrates a state (initial-restraint state) where, at the point with coordinate X0, the impactor 26 comes into contact with the additional chamber 13 (see FIG. 10A-1) and starts to be subjected to the load (resistance force) by the additional chamber 13. On the other hand, graph G2 illustrates that, due to the lack of the additional chamber 13, the impactor 26 does not come into contact with the vehicular curtain airbag apparatus M at the point with coordinate X0 (see FIG. 10B-1) and is thus not subjected to the load by the vehicular curtain airbag apparatus M, resulting in no restraint effect.

When the impactor 26 reaches coordinate X1 (see FIGS. 10A-2 and 10B-2), the load (resistance force) imposed by the additional chamber 13 starts to increase, enhancing the restraint effect, as shown by graph G1. On the other hand, for the conventional vehicular curtain airbag apparatus M, the impactor 26 comes into contact with the vehicular curtain airbag apparatus M at the point with coordinate X1, and displacement larger than the displacement at coordinate X0, in other words, delay, occurs, followed by the initial-restraint state, as shown by graph G2.

When the impactor 26 reaches coordinate X2 (see FIGS. 10A-3 and 10B-3), both the additional chamber 13 and the conventional vehicular curtain airbag apparatus M are pushed by the impactor 26 and deformed at the position of the side window 3. Thus, the load (reaction force) further increases as illustrated by graphs G1 and G2. The load in the case of the normal vehicular curtain airbag apparatus M is lower than the load in the case with the additional chamber 13, which involves the delay, as illustrated by graph G2.

During a process where the impactor 26 further passes through coordinate X3 to coordinate X4 (see FIGS. 10A-4, 10B-4, and 10B-5), both the additional chamber 13 and the conventional vehicular curtain airbag apparatus M are moved toward the vehicle exterior side. The first cell 22 is only partly pushed out toward the vehicle exterior side with respect to the side window 3. However, with the conventional vehicular curtain airbag apparatus M, the whole first cell 22 is illustrated to be pushed out toward the vehicle exterior side with respect to the side window 3. The provision of the additional chamber 13 allows the peak represented by point R1 to be reached before coordinate X4 is reached as depicted by graph G1. That is, the provision of the additional chamber 13 allows restraint to be started earlier, thus enabling a reduction in peak load. On the other hand, the lack of the additional chamber 13 causes the graph G2 to shift from coordinate X3 to coordinate X4, where the peak represented by point R2 is reached. In this case, the peak represented by point R1 is smaller than the peak represented by point R2.

As described above, a comparison between graphs G1 and G2 clearly indicates that the use of the additional chamber 13 allows the curtain airbag 2 to come into contact with the impactor 26 earlier, with the result that impact energy can be absorbed earlier, enabling a reduction in the peak of the load imposed on the impactor 26.

Figure 12:
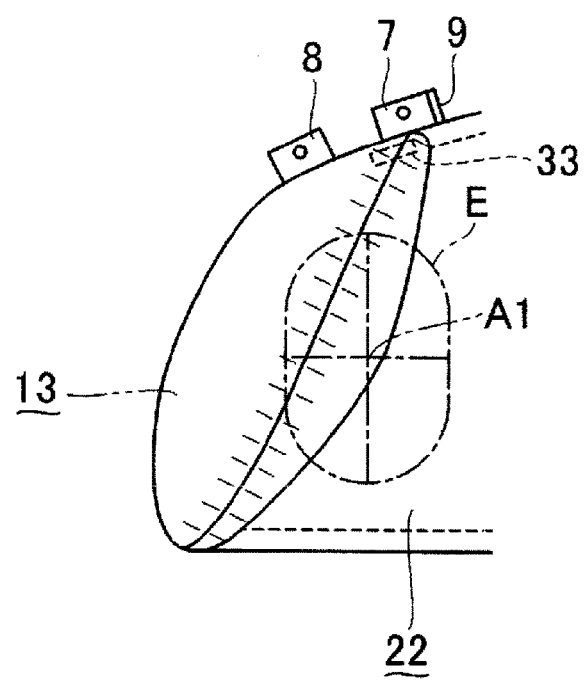
FIG. 12 is a diagram illustrating a collision assumed area.

With reference to FIG. 12 and FIG. 13, the results of evaluation tests on exterior ejection prevention performance will be described which tests were conducted with the above-described distance h (see FIG. 9) set as needed. FIG. 12 is a diagram illustrating an impact expected area. FIG. 12 depicts the impact expected area E and the A1 break point that overlap the first cell 22 depicted in FIG. 5.

FIG. 13 is a diagram illustrating the results of the evaluation tests on exterior ejection prevention performance. FIG. 13A illustrates groups 1 to 8 into which curtain airbags were divided according to the value of the distance h and the results of tests for the groups 1 to 8. FIG. 13B illustrates numerical data (the distance of protrusion) corresponding to bases for the results of the tests illustrated in FIG. 13A.

In FIG. 13A, "double circles" indicate that the distance of exterior ejection (distance of protrusion) is "76 mm or shorter". "Circles" indicate that the distance of protrusion is "76 to 78 mm". "Triangles" indicate that the distance of protrusion is "78 to 80 mm". "Crosses" indicate that the distance of protrusion is "80 mm or longer". The inventors conducted the tests with the distance h changed in increments of 5 mm and checked the distance of protrusion as needed, as depicted in FIG. 13B. The distance of protrusion and the numerical data were obtained using curtain airbags shaped similarly to the curtain airbag 2 used in the tests. The appropriate distance of protrusion and numerical data vary according to the shapes of the chambers, individual internal pressures, and the like. However, the distance h is determined relative to the impactor, and the characteristics of changes in the distance of protrusion with respect to the distance h are considered to be the same.

The test results indicate that the distance of protrusion decreases when the strap 25 is located below the position at a distance h of 0 mm as depicted in FIG. 13A. In particular, at a distance h of 30 to 50 mm, the distance of protrusion is short, indicating an appropriate state. As depicted in FIG. 13B, the distance of protrusion is minimized (74 mm) at a distance h of 40 mm. Therefore, the distance h is most preferably 40 mm as a reference±10 mm.

When the impactor 26 pushes the curtain airbag 2, the curtain airbag 2 turns around the vicinity of the upper end of the curtain airbag 2 toward the vehicle exterior as depicted in FIG. 10. In conjunction with the turn, the strap 25 relatively moves from a lower side to an upper side. If the strap 25 is not provided on the second plane L2 resulting from downward parallel translation of the first plane L1 and only the second attachment point Q is set below the first plane L1, then the strap 25 is actually loosened due to the turn of the curtain airbag 2. When the strap 25 is provided below and substantially parallel to the first plane L1, the tension of the strap 25 increases in conjunction with the turn of the curtain airbag 2. Consequently, the strap 25 is preferably provided below and substantially parallel to the first plane L1.

Therefore, the vehicular curtain airbag apparatus 1 in the present embodiment has been clarified to allow the exterior ejection prevention performance to be enhanced by setting the first attachment point P of the strap 25 extending through the vehicle exterior side of the additional chamber 13 and attached to the partition portion 19 on the vehicle exterior side to include the second plane L2 resulting from 30- to 50-m downward parallel translation of the first plane L1.

In the curtain airbag 2, the narrow strap 25 is used instead of what is called a wide tension cloth and can thus be easily and appropriately housed in the front pillar 6. The tension cloth includes a large amount of cloth portion, and when the curtain airbag 2 is folded, becomes massive and fails to be easily and appropriately housed. For example, in some cases, the tension cloth can be applied only to vehicles with large front pillars.

In other words, in the curtain airbag 2, with the position of attachment of the strap 25 to the front pillar 6 taken into account, the first attachment point P is set to include the second plane L2. Thus, even when the strap 25 narrower than the tension cloth is used, the strap 25 can be easily and appropriately housed in the front pillar 6 without sacrificing the exterior ejection prevention performance. The exterior ejection prevention performance can rather be enhanced.

Figure 14A:
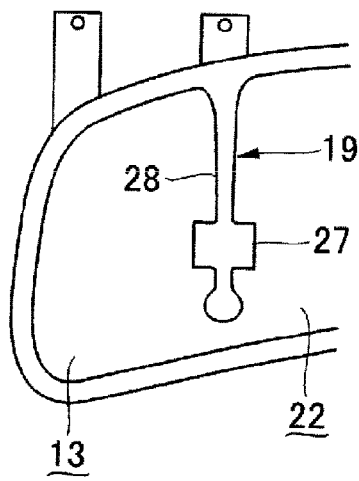
FIG. 14A to 14F are diagrams illustrating a comparison of a partition portion in FIGS. 2 and 3 or FIGS. 7 and 8 with a partition portion in a comparative example.
Figure 14D:
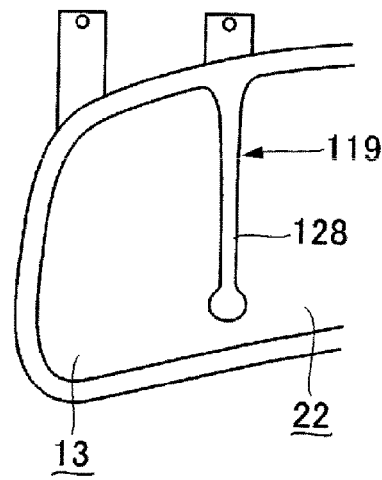
Figure 14B:
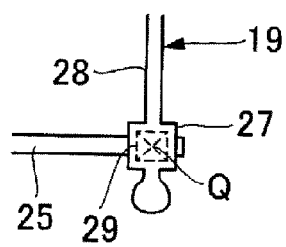
Figure 14E:
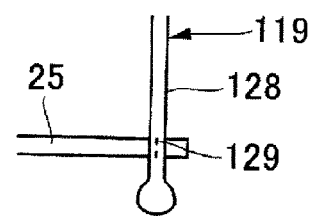
Figure 14C:
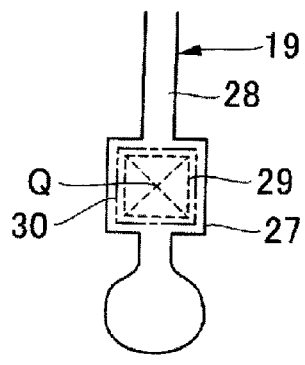
Figure 14F:
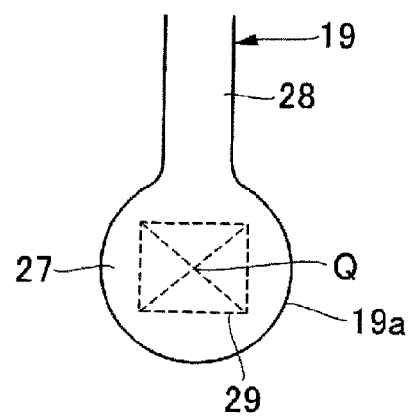

Now, with reference to FIG. 14 and FIG. 15, the partition portion 19 will be described. FIGS. 14A to 14F are diagrams illustrating a comparison between the partition portion 19 depicted in FIG. 2 and the like and a partition portion 119 in a comparative example. FIG. 14A schematically depicts the partition portion 19 in FIG. 2 and the like. FIG. 14B is a diagram depicting the second attachment point Q set in the partition portion 19. FIG. 14C is a diagram depicting the use of a sealing material. FIG. 14D schematically depicts a partition portion 119 in the comparative example. FIG. 14E is a diagram depicting the second attachment point Q set in the partition portion 19. FIG. 14F is a diagram depicting the second attachment point Q set at a terminal portion 19a of the partition portion 19. The partition portions 19 and 119 define the above-described additional chamber 13.

As depicted in FIG. 14A, the partition portion 19 has a wide portion 27 and a thin-line portion 28. The wide portion 27 is located in the middle of the thin-line portion 28 and is wider than the thin-line portion 28.

As depicted in FIG. 14B, the second attachment point Q is positioned in the wide portion 27. The wide portion 27 has a sewing area 29 including not only the second attachment point Q but also a periphery of the second attachment point Q. The trailing end of the strap 25 is attached to the wide portion 27 across the sewing area 29 by sewing. In this manner, the periphery of the second attachment point Q can also be sewn to the sewing area 29 included in the wide portion 27 as depicted in FIG. 14B. Therefore, the partition portion 19 with the wide portion 27 enables the trailing end of the strap 25 to be reliably sewn, allowing a sufficient strength to be maintained.

Since the partition portion 19 has the wide portion 27, even when a sealing material 30 is used as depicted in FIG. 14C, a space in the sewing area 29 is available for sewing, facilitating the sewing.

In contrast, the partition portion 119 in the comparative example does not have the wide portion 27 but have a thin-line portion 128 as depicted in FIG. 14D. The thin-line portion 128 is, for example, only 7 mm in width.

Thus, the second attachment point Q is positioned on the narrow thin-line portion 128 as depicted in FIG. 14E. In other words, the trailing end of the strap 25 is attached to the thin-line portion 128 by performing sewing on the narrow thin-line portion 128 as depicted by a sewing line 129. Therefore, in the partition portion 119 in the comparative example, a sufficient space to which the training end of the strap 25 can be reliably sewn is difficult to find.

The wide portion 27 may be provided at the terminal portion 19a of the partition portion 19 as depicted in FIG. 14F. In this case, since the separate wide portion 27 is not provided in the middle of the thin-line portion 28, the partition portion 19 is precluded from being excessively large, preventing the volume of the additional chamber 13 or the first cell 22 from being affected. Thus, inflation following deployment can be smoothly achieved.

Figure 15:
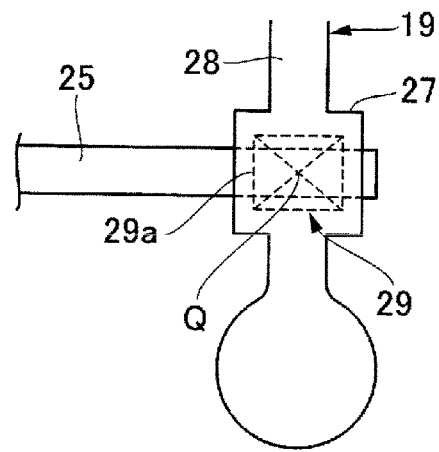
FIG. 15 is a schematic diagram illustrating a positional relation between a strap and the partition portion in FIGS. 2 and 3 or FIGS. 7 and 8.

FIG. 15 is a schematic diagram illustrating the strap 25 attached to the partition portion 19. The trailing end of the strap 25 is attached to the partition portion 19 by sewing the second attachment point Q and the periphery thereof to the sewing area 29 included in the wide portion 27 as depicted in FIG. 15.

A sewing line 29a depicted in FIG. 15 is one of a plurality of sewing lines forming the sewing area 29 that is located at the foremost position in the vehicle.

As depicted in FIG. 3A, when the additional chamber 13 is laid on top of the main chamber 12, the second attachment point Q of the strap 25 is located away from the fold-back line at the fold-back position J. Specifically, the fold-back position J is set in front of the sewing line 29a positioned at the foremost position in the sewing area 29 in the wide portion 27. Although not depicted in the drawings, the fold-back position may be set behind a sewing line positioned at the rearmost position in the sewing area 29 in the wide portion 27. In either way, the fold-back position J (fold-back line) avoids being set to traverse the sewing area 29. When even a part of the sewing area 29 is folded back, an internal portion of the sewing area 29 may be bent along the fold-back line J. The presence of the bent portion may cause the sewing area 29 to interfere with the end the curtain airbag 2 that has been wound into a roll, precluding the predetermined deploying behavior from being performed. Setting the relation between the fold-back position J and the sewing area 29 as described above prevents the interference, allowing a stable deploying capability to be exerted.

In the above-described embodiment, the distance of exterior ejection is reduced by attaching the strap 25 to the partition portion 19 on the vehicle exterior side and setting the first attachment point P on the second plane L2.

In the above-described embodiment, given that the first attachment point P of the strap 25 is set to include the second plane L2, a center line of the strap 25 in the width direction thereof (for example, a line with which the first attachment point P and the second attachment point Q are connected together and which is depicted as an alternate long and short dash line in FIG. 9) preferably lies within the range where the second plane L2 can be present, that is, the range where the first plane L1 is translated 30 to 50 mm downward in the vertical direction in the vehicle. So long as the center line is present within the above-described range, the strap 25 need not necessarily be parallel to the first plane L1 and the second plane L2 but may, for example, be inclined to the vertical direction of the vehicle. Furthermore, when the curtain airbag 2 is deployed and inflated, the strap 25 is present within the above-described range when, hence, the exterior ejection prevention performance is enhanced.

The vehicular curtain airbag apparatus 1 and the attachment structure therefor according to the present embodiment will be described. For the vehicular curtain airbag apparatus 1, the curtain airbag 2 is folded or wound into a housed state, then attached and fixed by the tabs 7 to 10 to the vehicle so as to extend from the roof side rail 4 to the front pillar 6 along the front-rear direction of the vehicle, and thus stored.

As depicted in FIG. 4, the additional chamber 13 is folded back near the partition portion 19 toward the vehicle interior 5 and toward the rear of the vehicle so as to overlap the main chamber 12 and housed together with the main chamber 12. At this time, the additional chamber 13 and the first cell 22 in the main chamber 12 are coupled together with the chamber coupling portion 33. By way of example, the additional tab 7 is laid on top of the second tab 9 and attached and fixed to the roof side rail 4 or the like to anchor the additional chamber 13 to the vehicle.

When the inflator 16 is actuated to feed the inflator gas into the main chamber 12, the curtain airbag 2 is deployed and inflated downward. The front end of the main chamber 12, located near the first cell 22, is deployed and inflated downward at a position near the front pillar 6. At the same time, the inflator gas flows from the main chamber 12 into the additional chamber 13 via the communication portion 20. The additional chamber 13, into which the inflator gas has flown, is coupled to the main chamber 12 with the chamber coupling portion 33 and anchored to the vehicle with the additional tab 7. In this state, the additional chamber 13 is deployed and inflated downward.

Since the additional chamber 13 is folded back near the partition portion 19 so as to overlap the main chamber 12 and coupled to the main chamber 12 with the chamber coupling portion 33, the additional chamber 13 is deployed and inflated on the vehicle interior 5 side of the main chamber. At this time, as depicted in FIG. 5 and FIG. 6, the main chamber 12 and the additional chamber 13 are deployed and inflated between the steering wheel 17 and the front pillar 6 such that the resultant main chamber 12 and additional chamber 13 appear to be V-shaped when the periphery of the driver seat 14 is viewed from above in the vehicle. Consequently, the main chamber 12 and the additional chamber 13 are deployed and inflated so as to cover the vicinity of the front pillar 6 and the periphery of the instrument panel 18. This also applies to the front occupant seat.

Thus, the additional chamber 13 is deployed and inflated in the predetermined area in front of the inflation area C of the driver seat airbag or the inflation area of the passenger seat airbag in the vehicle. Consequently, the deployed and inflated additional chamber 13 and thus the deployed and inflated curtain airbag 2 can be prevented from interfering with the simultaneously deployed and inflated driver seat airbag or passenger seat airbag. Since the airbags can be prevented from interfering with one another, the occupant protection performance of the airbags can be reliably provided.

As described above, the curtain airbag 2 is prevented from interfering with the driver seat airbag and the passenger seat airbag, allowing the occupant protection performance to be appropriately provided either in a normal collision mode in which the airbags function or in a small overlap mode.

In the small overlap mode, at what angle the occupant rushes in is unknown. However, the first tab 8 functions effectively in such a contingency situation to allow the occupant protection performance to be more reliably provided.

The chamber coupling portion 33 allows the additional chamber 13 and the first cell 22 to be positioned, at the time of actuation, in front of the inflation area C of the driver seat airbag or the passenger seat airbag in the vehicle, with the front end of the deployed and inflated main chamber 12 reliably overlapping the deployed and inflated additional chamber 13. Thus, in the small overlap mode, the occupant can be appropriately protected upon rushing toward the front pillar 6 between the windshield (instrument panel 18) and the side window 3.

The above-described positional relation between the additional chamber 13 and the main chamber 12 during deployment and inflation can be controlled simply by using the chamber coupling portion 33. Thus, the curtain airbag apparatus 1 has a simple apparatus configuration and high productivity and can provide the desired occupant protection performance. The chamber coupling portion 33 may be formed by sewing or bonding, and the curtain airbag apparatus is also highly productive in this term. Setting the chamber coupling portion 33 at the non-inflation portion 31 allows high coupling strength to be achieved.

Since the configuration of the curtain airbag apparatus can be formed by providing the apparatus with the additional tab that allows the anchorage, to the vehicle, of the additional chamber 13 folded back near the partition portion 19 toward the vehicle interior 5 and toward the rear of the vehicle to overlap the main chamber 12, and by anchoring the additional tab to the vehicle, the curtain airbag apparatus 1 has a simple apparatus configuration and a simple structure for attachment to the vehicle, is highly productive, and allows assembly operations to be easily and efficiently performed.

Since the first tab 8 is set to allow the vicinity of the upper portion of the partition portion 19 to be attached and fixed to the vehicle, the attachment position of the additional chamber 13 laid on top of the main chamber 12 can be reliably set, enabling the additional chamber 13 to be appropriately actuated.

The second tab 9 is set to allow the main chamber 12 to be attached and fixed to the vehicle near the position where the additional tab 7 is anchored to the vehicle. This compensates for the function of the chamber coupling portion 33 to allow the attachment and fixation to the vehicle to be achieved with the front end (periphery of the first cell 22) of the deployed and inflated main chamber 12 reliably overlapping the deployed and inflated additional chamber 13.

In the alternative embodiment, the additional chamber 13 and the first cell 22 can be positioned, at the time of actuation, in front of the inflation area C of the driver seat airbag or the passenger seat airbag in the vehicle, with the front end (periphery of the first cell 22) of the deployed and inflated main chamber 12 reliably overlapping the deployed and inflated additional chamber 13. Thus, in the small overlap mode, the occupant can be appropriately protected upon rushing toward the front pillar 6 between the windshield (instrument panel 18) and the side window 3.

The additional tab 7 and at least a part of the second tab 9 are attached and fixed to the vehicle while overlapping each other. This enables the structure for attachment to the vehicle to be further simplified, allowing the assembly operations to be more easily and efficiently performed.

The additional chamber 13 is folded back at a position in front of the partition portion 19 in the vehicle. This enables reliable actuation of the first cell 22, more stable feeding of the inflator gas into the additional chamber 13 through the communication portion 20, and more stable actuation of the strap 25 with the trailing end thereof attached to the partition portion 19.

Figure 16:
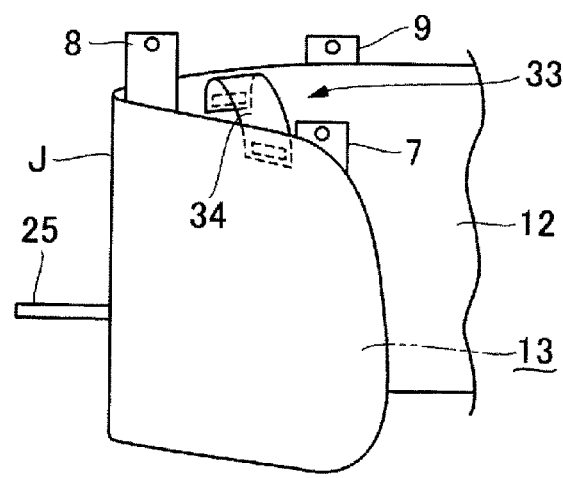
FIG. 16 is a partially enlarged perspective view depicting a variation of a chamber coupling portion depicted in FIG. 2.

FIG. 16 depicts a variation of the chamber coupling portion 33. FIG. 16 is an enlarged perspective view depicting the chamber coupling portion 33 according to the variation. As depicted in the variation, a bridge member 34 with an appropriate length may be provided between the additional chamber 13 and the main chamber 12 folded back so as to face each other, to bridge the additional chamber 13 and the main chamber 12 via a desired distance. The bridge member 34 is secured at one end to any position on the main chamber 12, for example, to the upper end of the main chamber 12, by sewing or bonding, and at the other end to any position on the additional chamber 13, for example, to the upper end of the additional chamber 13, by sewing or bonding. The length—the distance between opposite ends of the bridge member 34—of the bridge member 34 to be fixed to the main chamber 12 or the like can be appropriately set, allowing the distance of protrusion of the additional chamber 13 from the main chamber 12 to be adequately adjusted according to the layout of the vehicle and the like. The bridge member 34 may be formed of any material such as a synthetic resin material so long as the material is flexible and the bridge member 34 exerts a considerable tensional resistance force. In the illustrated example, a tether that is a band-like cloth material is provided by way of example. Such a tether has been adopted in many cases, involves an easy attachment operation, and allows the vehicular curtain airbag apparatus 1 to be manufactured with high productivity.

The above-described vehicular curtain airbag apparatus 1 and attachment structure therefor are preferred examples of the present invention. Other embodiments may be implemented or achieved in various manners. In particular, the present invention is not restricted by the detailed shapes, sizes, configurations, arrangements, and the like of the components depicted in the accompanied drawings as long as the specification contains no corresponding description intended for limitation. The expressions and terms used herein are intended for description, and the present invention is not limited to the expressions and terms as long as the specification contains no corresponding description intended for limitation.

While the above description constitutes the preferred embodiment of the present invention, it will be appreciated that the invention is susceptible to modification, variation and change without departing from the proper scope and fair meaning of the accompanying claims.

What is claimed is:

1. A vehicular curtain airbag apparatus having a vehicular curtain airbag that is deployed and inflated along a side surface portion of a vehicle interior from an upper side to a lower side of the side surface portion, the vehicular curtain airbag apparatus comprising:
   a main chamber formed in the curtain airbag and having a front end enabled to be deployed and inflated downward at a position near a front pillar of the vehicle;
   an additional chamber being enabled to be deployed and inflated, formed in the curtain airbag and positioned further toward a vehicle front side than the front end of the main chamber, and separated from the main chamber by a partition portion set between the front pillar and an inflation area of a driver seat airbag or a passenger seat airbag; and a communication portion formed in the partition portion so as to penetrate the partition portion thereby allowing the main chamber and the additional chamber to communicate with each other, wherein the additional chamber is folded back near the partition portion toward the vehicle interior and toward a rear of the vehicle so as to overlap the main chamber, and parts of a resultant overlapping portion corresponding to upper portions of the main chamber and the additional chamber or vicinities of these parts are coupled together to form a chamber coupling portion, wherein the vehicular curtain airbag apparatus comprises a bridge member defining the chamber coupling portion and having an appropriate length provided between the additional chamber and the main chamber folded back so as to face each other, to bridge the additional chamber and the main chamber by a desired distance, and the additional chamber is deployed and inflated in a predetermined area in front of the inflation area of the driver seat airbag or the passenger seat airbag in the vehicle.

2. The vehicular curtain airbag apparatus according to claim 1, wherein the bridge member is a tether that is a band-like cloth material.

3. The vehicular curtain airbag apparatus according to claim 1, further comprising a first tab that allows a vicinity of an upper end of the partition portion to be attached and fixed to the vehicle when the additional chamber is folded back near the partition portion toward the vehicle interior and toward the rear of the vehicle so as to overlap the main chamber.

4. The vehicular curtain airbag apparatus according to claim 3, further comprising an additional tab provided at an upper end of the additional chamber at a position away from the first tab, the additional tab anchoring the additional chamber to the vehicle when the additional chamber is laid on top of the main chamber.

5. The vehicular curtain airbag apparatus according to claim 4, wherein the curtain airbag includes a second tab that allows the main chamber to be attached and fixed to the vehicle near a position where the additional tab is anchored to the vehicle.

6. The vehicular curtain airbag apparatus according to claim 5, wherein at least parts of the additional tab and the second tab are attached and fixed to the vehicle so as to overlap each other.

7. The vehicular curtain airbag apparatus according to claim 1, wherein the additional chamber is folded back at a position in front of the partition portion in the vehicle.

8. The vehicular curtain airbag apparatus according to claim 1 wherein the communication portion is positioned above a door trim line of the vehicle when the vehicular curtain airbag apparatus is deployed and inflated.

9. The vehicular curtain airbag apparatus according to claim 1, further comprising a strap provided in front of the main chamber and having a front end coupled to the front pillar at a first attachment point to apply a tension to the main chamber when the main chamber is deployed.

10. The vehicular curtain airbag apparatus according to claim 1, wherein the communication portion is positioned above a door trim line of the vehicle when the vehicular curtain airbag apparatus is deployed and inflated.

11. A vehicular curtain airbag apparatus having a vehicular curtain airbag that is deployed and inflated along a side surface portion of a vehicle interior from an upper side to a lower side of the side surface portion, the vehicular curtain airbag apparatus comprising:

a main chamber having a plurality of main chamber tabs disposed along an upper edge of the main chamber for attachment and fixation to the upper side of the side surface portion of the vehicle, a front end of the main chamber being enabled to be deployed and inflated downward at a position near a front pillar of the vehicle;

an additional chamber positioned further toward a vehicle front side than the front end of the main chamber and enabled to be deployed and inflated, and separated from the main chamber by a partition portion set between the front pillar and an inflation area of a driver seat airbag or a passenger seat airbag;

a communication portion formed in the partition portion so as to penetrate the partition portion thereby allowing the main chamber and the additional chamber to communicate with each other; and a first tab that allows a vicinity of an upper end of the partition portion to be attached and fixed to the vehicle when the additional chamber is folded back near the partition portion toward the vehicle interior and toward a rear of the vehicle so as to overlap the main chamber, wherein the first tab allows upper portions of front ends of both the additional chamber and the main chamber to be fixed to the vehicle when the additional chamber is folded back and the vehicular curtain airbag is deployed, wherein the additional chamber is deployed and inflated in a predetermined area in front of the inflation area of the driver seat airbag or the passenger seat airbag in the vehicle.

12. The vehicular curtain airbag apparatus according to claim 11, further comprising an additional tab provided at an upper end of the additional chamber at a position away from the first tab, the additional tab anchoring the additional chamber to the vehicle when the additional chamber is laid on top of the main chamber.

13. The vehicular curtain airbag apparatus according to claim 12, wherein the plurality of main chamber tabs include a second tab that allows the main chamber to be attached and fixed to the vehicle near a position where the additional tab is anchored to the vehicle.

14. The vehicular curtain airbag apparatus according to claim 13, wherein at least parts of the additional tab and the second tab are attached and fixed to the vehicle so as to overlap each other.

15. The vehicular curtain airbag apparatus according to claim 11, wherein the first tab is provided at a position at which the first tab is folded back together with the additional chamber in a vicinity of a position further toward a vehicle front side than the position, where the additional chamber is folded back.

16. The vehicular curtain airbag apparatus according to claim 11, wherein the first tab is provided in a vicinity of a position further toward a vehicle rear side than the position, where the additional chamber is folded back.

17. The vehicular curtain airbag apparatus according to claim 11, further comprising a strap provided in front of the main chamber and having a front end coupled to the front pillar at a first attachment point to apply a tension to the main chamber when the main chamber is deployed.

18. The vehicular curtain airbag apparatus according to claim 17, wherein the strap extends through an exterior side of the additional chamber and is coupled, at a rear end of the strap, to a second attachment point near the partition portion.

19. The vehicular curtain airbag apparatus according to claim 18, wherein the second attachment point is set below the first attachment point.

20. The vehicular curtain airbag apparatus according to claim 17, wherein the first attachment point is set to include a horizontal second plane resulting from 30- to 50-mm downward parallel translation of a horizontal first plane extending through a break point that is a center of an impact expected area of the main chamber.

21. The vehicular curtain airbag apparatus according to claim 20, wherein a center line of the strap in a width direction thereof lies within a range where the second plane can be present.

22. The vehicular curtain airbag apparatus according to claim 18 wherein the rear end of the strap is attached to the second attachment point by sewing, and a sewn portion is formed at a position away from a fold-back portion at which the additional chamber is laid on top of the main chamber.

23. An attachment structure for a vehicular curtain airbag apparatus having a vehicular curtain airbag that is deployed and inflated along a side surface portion of a vehicle interior from an upper side to a lower side of the side surface portion, the attachment structure comprising:
  a main chamber having a plurality of tabs disposed along an upper edge of the main chamber for attachment and fixation to the upper side of the side surface portion of the vehicle, a front end of the main chamber being enabled to be deployed and inflated downward at a position near a front pillar of the vehicle;
  an additional chamber positioned further toward a vehicle front side than the front end of the main chamber and enabled to be deployed and inflated, and separated from the main chamber by a partition portion set between the front pillar and an inflation area of a driver seat airbag or a passenger seat airbag;
  a communication portion formed in the partition portion so as to penetrate the partition portion thereby allowing the main chamber and the additional chamber to communicate with each other; and
  a first tab that allows a vicinity of an upper end of the partition portion to be attached and fixed to the vehicle when the additional chamber is folded back near the partition portion toward the vehicle interior and toward a rear of the vehicle so as to overlap the main chamber,
  wherein, to allow the additional chamber to be deployed and inflated in a predetermined area in front of the inflation area of the driver seat airbag or the passenger seat airbag in the vehicle, the main chamber is attached and fixed to the vehicle with the plurality of main chamber tabs, and the vicinity of the upper end of the partition portion is attached and fixed to the vehicle with the first tab such that upper portions of front ends of both the additional chamber and the main chamber are fixed by the first tab to the vehicle with the additional chamber folded back.

24. The attachment structure for a vehicular curtain airbag apparatus according to claim 23, further comprising an additional tab provided at an upper end of the additional chamber at a position away from the first tab, the additional tab anchoring the additional chamber to the vehicle when the additional chamber is laid on top of the main chamber.

25. The attachment structure for a vehicular curtain airbag apparatus according to claim 23, wherein the plurality of main chamber tabs include a second tab that allows the main chamber to be attached and fixed to the vehicle near a position where the additional tab is anchored to the vehicle.

26. The attachment structure for a vehicular curtain airbag apparatus according to claim 25, wherein at least parts of the additional tab and the second tab are attached and fixed to the vehicle so as to overlap each other.

27. The attachment structure for a vehicular curtain airbag apparatus according to claim 23, wherein the first tab is provided at a position at which the first tab is folded back together with the additional chamber in a vicinity of a position further toward a vehicle front side than the position, where the additional chamber is folded back.

28. The attachment structure for a vehicular curtain airbag apparatus according to claim 23, wherein the first tab is provided in a vicinity of a position further toward a vehicle rear side than the position, where the additional chamber is folded back.

29. The attachment structure for a vehicular curtain airbag apparatus according to claim 23, further comprising a strap provided in front of the main chamber and having a front end coupled to the front pillar at a first attachment point to apply a tension to the main chamber when the main chamber is deployed.

30. The attachment structure for a vehicular curtain airbag apparatus according to claim 29, wherein the strap extends through an exterior side of the additional chamber and is coupled, at a rear end of the strap, to a second attachment point near the partition portion.

31. The attachment structure for a vehicular curtain airbag apparatus according to claim 30, wherein the second attachment point is set below the first attachment point.

32. The attachment structure for a vehicular curtain airbag apparatus according to claim 29, wherein the first attachment point is set to include a horizontal second plane resulting from 30- to 50-mm downward parallel translation of a horizontal first plane extending through a break point that is a center of an impact expected area of the main chamber.

33. The attachment structure for a vehicular curtain airbag apparatus according to claim 32, wherein a center line of the strap in a width direction thereof lies within a range where the second plane can be present.

34. The attachment structure for a vehicular curtain airbag apparatus according claim 30, wherein the rear end of the strap is attached to the second attachment point by sewing, and a sewn portion is formed at a position away from a fold-back portion at which the additional chamber is laid on top of the main chamber.

35. The attachment structure for a vehicular curtain airbag apparatus according to claim 23, wherein the communication portion is positioned above a door trim line of the vehicle when the vehicular curtain airbag apparatus is deployed and inflated.

* * * * *